(12) United States Patent
Kim et al.

(10) Patent No.: US 6,668,091 B1
(45) Date of Patent: Dec. 23, 2003

(54) 3D MESH CODING/DECODING METHOD

(75) Inventors: Sung-jin Kim, Suwon (KR); Mun-sup Song, Yongin (KR); Euee-seon Jang, Kyungki-do (KR); Mahn-jin Han, Seoul (KR); Seok-yoon Jung, Seoul (KR); Yang-seock Seo, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/339,161

(22) Filed: Jun. 24, 1999

(30) Foreign Application Priority Data

Oct. 2, 1998 (KR) .......................................... 98-41763
Dec. 1, 1998 (KR) .......................................... 98-52327

(51) Int. Cl.⁷ ................................................ G06K 9/36
(52) U.S. Cl. ......................... 382/243; 382/241; 716/5; 716/7
(58) Field of Search ............................... 382/243, 242, 382/241; 345/440; 716/5, 7

(56) References Cited

U.S. PATENT DOCUMENTS

| 5,392,036 | A | * | 2/1995 | Klein ........................... 341/51 |
| 5,825,369 | A | * | 10/1998 | Rossignac et al. .......... 345/440 |
| 5,894,308 | A | * | 4/1999 | Isaacs .......................... 345/420 |
| 5,905,507 | A | * | 5/1999 | Rossignac et al. .......... 345/440 |
| 5,966,140 | A | * | 10/1999 | Popovic et al. ............. 345/441 |
| 6,009,435 | A | * | 12/1999 | Taubin et al. ............... 707/101 |

* cited by examiner

Primary Examiner—Anh Hong Do
(74) Attorney, Agent, or Firm—Burns Doane Swecker & Mathis, LLP

(57) ABSTRACT

A progressive coding and decoding method of three-dimensional (3D) mesh data used in the fields of motion picture experts group-4 synthetic and natural hybrid coding (MPEG-4 SNHC), virtual reality modelling language (VRML) and the like. In transmitting 3D objects composed of 3D mesh data, it is very important to progressively restore transmitted data as well as to effectively code the 3D mesh data. In the progressive restoration, in the event that a transmission data error is generated, partial restoration of the transmitted data is allowed. Thus, it is possible to minimize the amount of mesh data to be transmitted again. The progressive restoration method which is resistant to such transmission errors can be effectively applied in wireless communications or low transmission rate communications. In the progressive coding and decoding method, connectivity, geometry and photometry necessary for progressively coding 3D mesh data are constructed and then coded/decoded, thereby providing data resilience against errors.

33 Claims, 26 Drawing Sheets

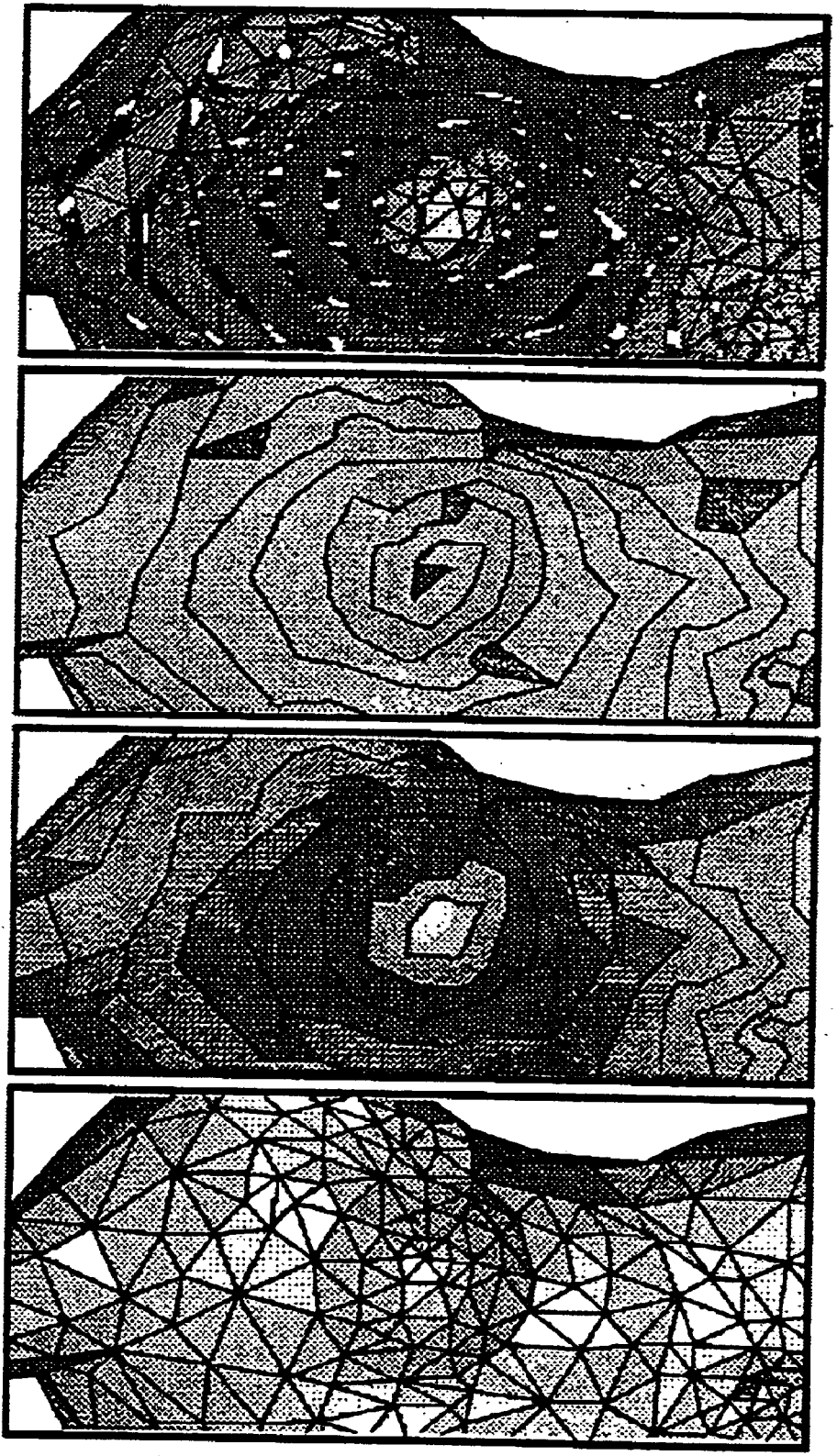

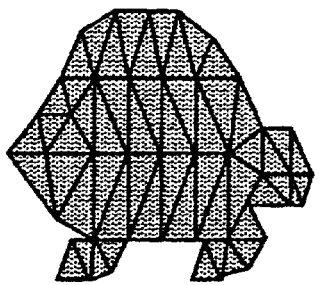
FIG. 10A
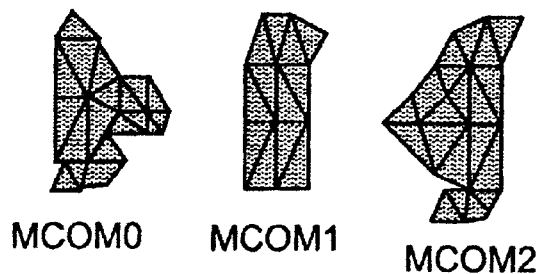
FIG. 10B
MCOM0  MCOM1  MCOM2
FIG. 11
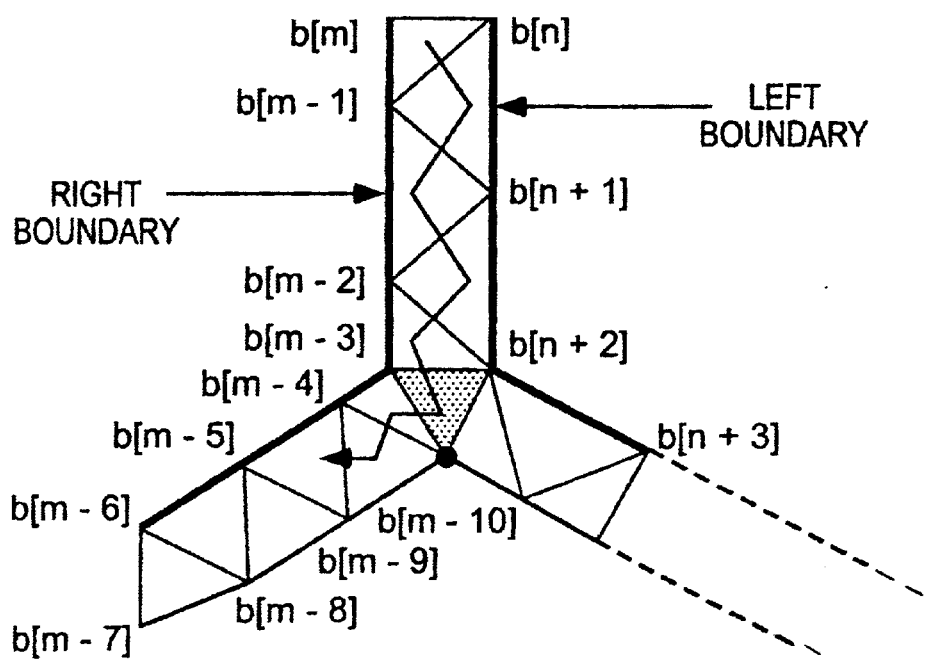

| sc | id | pt | vg | tt | td | tt | vg | td | vg | tt | td | ... |

FIG. 14B

| sc | id | pt | vg |

FIG. 14C

| sc | id | pt | vg | tt | td |

FIG. 14D

| sc | id | pt | vi | tt | td |

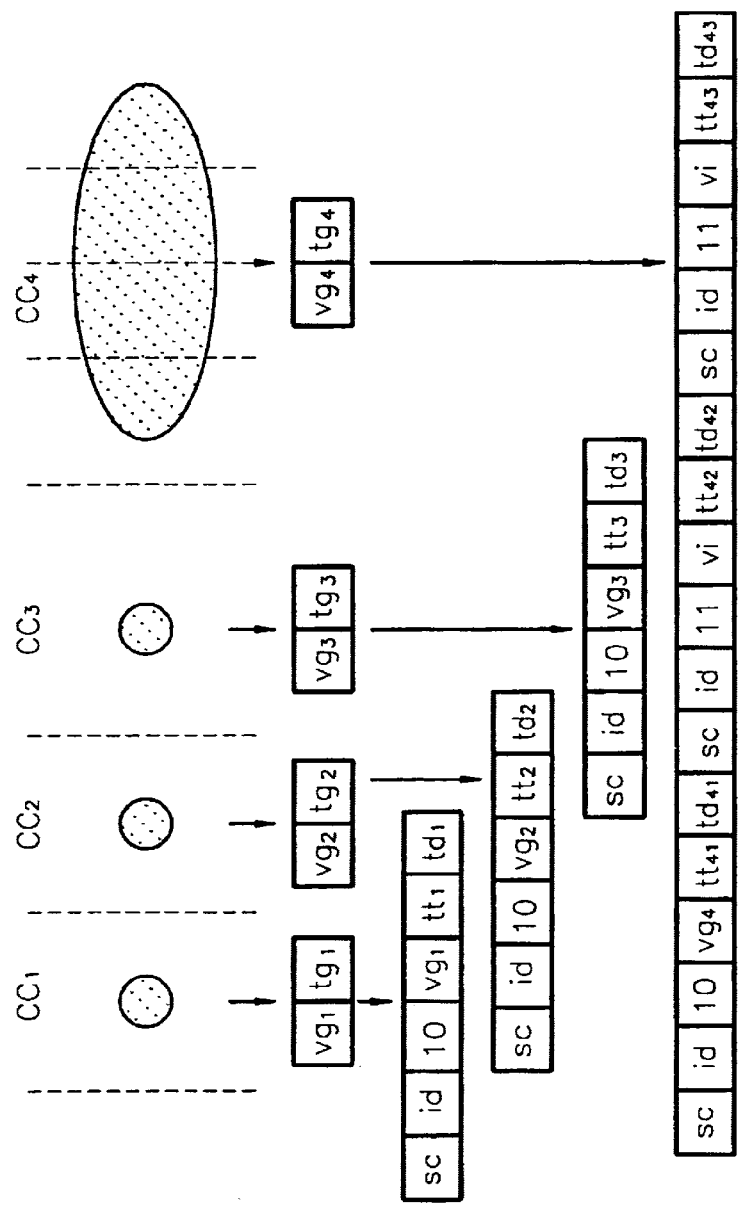

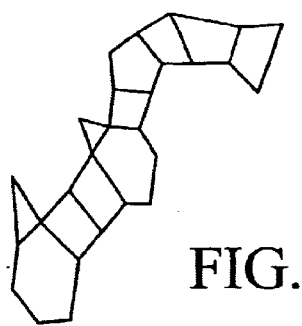
FIG. 18A
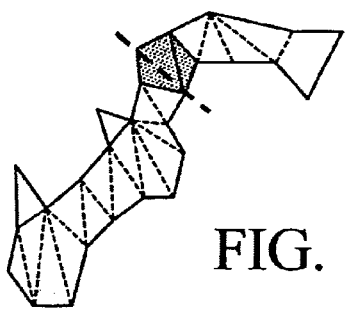
FIG. 18B
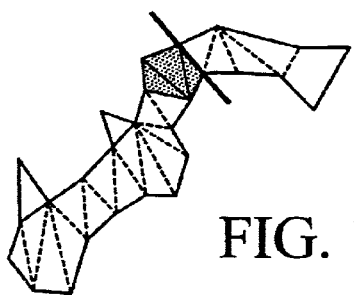
FIG. 18C
FIG. 18D
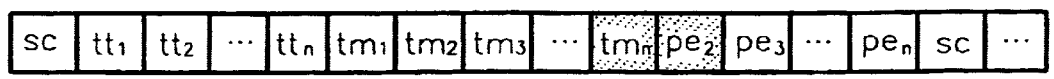
FIG. 18E
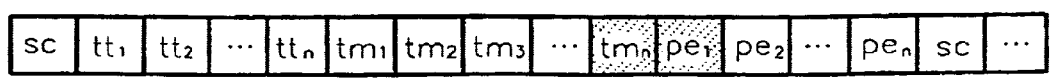

FIG. 22A

| L | R | tt | td |

FIG. 22B

| L | R | NUMBER OF Y-vertices(n) | Y₁ | Y₂ | ... | Yₙ | tt | td |

FIG. 23

| | |
|---|---|
| bnd[0][0] | bnd[0] |
| bnd[0][1] | bnd[1] |
| bnd[0][2] | bnd[2] |
| ... | ... |
| bnd[0][$n_1-1$] | bnd[$n_1-1$] |
| bnd[1][0] | bnd[$n_1$] |
| bnd[1][1] | bnd[$n_1+1$] |
| ... | ... |
| bnd[0][$n_2-1$] | bnd[$n_1+n_2-1$] |
| bnd[2][0] | bnd[$n_1+n_2$] |
| bnd[2][1] | bnd[$n_1+n_2+1$] |
| bnd[2][2] | bnd[$n_1+n_2+2$] |
| ... | ... |
| bnd[0][$n_3-1$] | bnd[$n_1+n_2+n_3-1$] |
| ... | ... |
| bnd[m-1][$n_m-1$] | bnd[$n_1+n_2+n_3+...+n_m-1$] |

FIG. 24A

| sc | 20 | $n_2-34$ | tt | td |
|---|---|---|---|---|

FIG. 24B

| sc | $n_1+20$ | $n_1+n_2-34$ | tt | td |
|---|---|---|---|---|

(n-1)-th MOL
POSITION OF PARTITION
(n)-th MOL (n-1)-th MOL
POSITION OF PARTITION
(n)-th MOL (n-1)-th MOL
POSITION OF PARTITION
(n)-th MOL (n-1)-th MOL
POSITION OF PARTITION
(n)-th MOL

FIG. 26A: | tm1 | gm1 | pro1 | tm2 | gm2 | pro2 | ... | gm2 | pro2 | ... |

FIG. 26B: | tm1 | tm2 | ... | gm1 | gm2 | gm3 | ... | pro1 | pro2 | ... |

FIG. 26C: | sc | id | tm1 | tm2 | ... | sc | id | gm1 | gm2 | gm3 | ... | sc | id | pro1 | pro2 | ... |

FIG. 28: | sc | id | vg | sc | id | #tri | tt | td | sc | td | tt | #tri | id | sc | tt | td | ... |

3D MESH CODING/DECODING METHOD

BACKGROUND OF THE INVENTION

1. Field of the Invention

The present invention relates to a progressive coding/decoding method of three-dimensional (3D) mesh data used in the fields of motion picture experts group-4 synthetic and natural hybrid coding (MPEG-4 SNHC), virtual reality modelling language (VRML) and the like.

2. Description of the Related Art

In transmitting 3D objects composed of 3D mesh data, it is very important to progressively restore transmitted data as well as to effectively code the 3D mesh data. In the event that a data error is generated due to a transmission path error, a progressive restoration would allow transmitted data to be partially restored and minimize the amount of mesh data to be retransmitted. The progressive restoration method which is robust against such communication path errors can be effectively used in wireless communications or low transmission rate communications. The purposes of the present invention are to construct connectivity, geometry and photometry necessary for progressively coding 3D mesh data and providing resilience against data errors, and to propose a coding/decoding method of the same.

The definitions of terms used in the art related to the invention will be first described as follows.

Polygonal mesh: A polygonal mesh is defined by coordinates (geometry) on a 3D space of vertices, the relationship (connectivity) between the respective faces and the vertices forming the same, and photometry such as color, normal or texture information, which do not affect the geometry of a mesh but affect the appearance of the mesh.

Face: A face is a set of vertex indices and a corner is a pair of (face, vertex) sets. A simple face is a set of vertex indices in which different indices form a face. In this invention, only a polygonal mesh consisting of simple faces will be dealt with.

Edge: A edge is a pair of vertex indices. If an edge appears on only one face in a polygonal mesh, the edge is defined as a "boundary" edge. If one and the same edge appears on several faces, the edge is defined as a "singular" edge. If an edge appears on only two neighboring faces, the edge is defined as an "internal" edge. The boundary edge and the internal edge are defined to be "regular".

Mesh graph and dual graph: One point is defined within each face of a mesh and then points defined above and passing through the internal edge between neighboring faces are connected to be defined as a dual graph. FIG. 5A is a mesh graph and FIG. 5B is a dual graph.

Connected component: A path in a polygonal mesh is a series of non-recurrent vertices such as consecutive vertex pairs connected by one edge. The first and last vertices on a path are referred to as being connected by the path. If all pairs of the vertices of a triangular mesh are connected by one path, the triangular mesh is referred to as being connected. If a triangular mesh is not connected, the triangular mesh can be split into at least two connected components. Each connected component is a connected triangular mesh consisting of a subset of vertices, edges and triangles of the original triangular mesh. If two vertices of the triangular mesh are connected by one path, they belong to the same connected component.

Virtual reality modeling language (VRML): The VRML is a graphic standard format prepared for describing and transmitting a virtual space in the Internet.

Moving Picture Experts Group (MPEG): The MPEG is a group for carrying out international standardization activities for standardizing a compression format for transmitting a variety of media such as video.

Mesh: A mesh is a representation of an object constructed of several polygons.

Node: A node is a vertex in a vertex spanning graph or a minimum description unit used in VRML.

Topological surgery: A topological surgery is a mesh coding method proposed by I.B.M. Corp. in which a mesh is cut along a given path in order to make the mesh into the form of strips.

Vertex spanning graph: A vertex spanning graph is a path for cutting a mesh in the topological surgery.

Triangle spanning tree: The triangle spanning tree is a binary tree as a triangle strip produced by cutting a mesh along the vertex spanning graph vrun: A vrun is a set of connected vertices and ends with a branch or vleaf.

vlast: A vlast indicates whether the current run is the last branch or not. If the current run is the last branch, the value of vlast is 1, and 0 otherwise.

vleaf: A vleaf indicates whether the current vertex run ends with a leaf or a branch. If the current vertex run ends with a leaf, the value of vleaf is 1, and 0 otherwise.

vlength is the length of a vertex run.

loopstart: The leaf of a vertex run may meet another vertex run to form a loop. In such a case, the start of the loop is indicated by the loopstart.

loopend: In the case when the leaf of a vertex run forms a loop, the end of the loop is indicated by the loopend.

loopmap: A loopmap indicates connectivity between the loopstart and the loopend and is a set of indices connecting edges from the loopend to the loopstart.

trun: A trun is a set of consecutive triangles and the end thereof is a leaf triangle or a branching triangle.

tleaf: A tleaf indicates whether the run of a triangle ends with a leaf triangle or a branching triangle. If the run of a triangle ends with a leaf triangle, the value of tleaf is 1, and 0 otherwise.

tmarching: A tmarching describes the marching aspect of triangles. If a strip has an edge at its right boundary, the value of tmarching is 1. If a strip has an edge at its left boundary, the value of tmarching is 0.

polygonedge: A polygonedge indicates whether a current edge is given from the original mesh model or inserted for representing the polygon as a set of triangles. If a current edge is given from the original mesh model, the value of polygonedge is 1, and 0, otherwise.

Torientation: A Torientation indicates whether the left or right side of the branching triangle is visited first. If the left side is visited first, 1 is given to the Torientation. If the right side is visited first, 0 is given.

In the conventional coding method of 3D mesh data, since the mesh data is wholly coded, it is almost impossible to partially restore data before an entire bitstream is received. Also, due to transmission path errors generated during transmission, even if only a part of the data is damaged, the entire bitstream of data must be received again. For example, ISO/IEC JTC1/SC29/WG11 MPEG-98/W2301, "MPEG-4 SNHC Verification Model 9.0" proposed by I.B.M. Corp. is currently being adopted as an MPEG-4 SNHC 3D mesh coding technology.

In MPEG-4 SNHC, mesh coding is designed based on VRML. In the VRML, a mesh is described in a node form referred to as an IndexedFaceSet. One of the main technologies for coding mesh data is a topological surgery proposed by I.B.M. Corp. According to this technology, it is assumed that a given mesh is the same as a sphere topologically. Then, the mesh is cut along a given cutting-edge to generate a triangle spanning graph having a binary tree structure. Here, the cutting-edge defined for cutting the mesh is configured such that it connects vertices, that is, it is given as a tree structure having a loop. The cutting-edge is referred to as a vertex spanning graph. Thus, two tree structures, that is, the triangle spanning graph and the vertex spanning graph, are coded/decoded, thereby restoring the original mesh without loss.

According to MPEG-4 SNHC, although there may be multiple IndexedFaceSets in a VRML file, compression is basically performed on the unit of one IndexedFaceSet. However, it is allowed to form a single IndexedFaceSet by several connected components.

In general, for fast graphics processing, modeling must be performed in units of triangles. These triangles are not formed randomly but are preferably connected to each other in the form of strips or fans. Also, the more symbols that are repeatedly represented, the better the compressibility is. To this end, a mesh formed by a single long triangular strip is proposed by I.B.M. Corp. in view of fast graphics processing and better compressibility.

FIG. 1 illustrates an example of a vertex spanning graph having a loop in which a vertex run returns to one of the passed vertices.

FIGS. 2A through 2F illustrate a conventional method for generating a vertex spanning graph and a triangle spanning graph in an example of a triangular mesh. In FIGS. 2A, 2B, 2C and 2D, the vertex spanning graph is drawn by a thick line, which may branch off into several branches from one branch. A mesh is cut along the vertex spanning graph to obtain a long connected triangular strip, which is referred to as a triangle spanning graph, as shown in FIG. 2C. FIG. 2E shows a procedure for generating a bounding loop formed by the vertex spanning graph, and FIG. 2F shows a dual graph. The dual graph shown in FIG. 2F is obtained by connecting an arbitrary point within a triangle and a point within another triangle next to the triangle via the edge of the triangle. In the case of a triangle spanning graph, the dual graph has a binary tree structure.

Since a mesh can be formed by several connected components, each connected component forming the mesh generates a pair of a vertex spanning graph shown in FIG. 2B and a triangle spanning graph shown in FIG. 2C. Therefore, if a single IndexedFaceSet is coded, several triangle spanning graphs and vertex spanning graphs can be obtained.

The method for restoring the data coded by the above-described method is as follows:
1. A bounding loop shown in FIG. 3 is generated using a vertex spanning graph.
2. When the third vertex of a triangle branching off in a triangle spanning tree is referred to as a Y-vertex, the Y-vertex is calculated using bitstreams of the triangle spanning tree.
3. Triangles or polygons are generated using a triangle marching bit of the triangle spanning graph.

Lossless compression using arithmetic coding of the vertex spanning graph and the triangle spanning graph has been proposed by I.B.M. Corp. However, according to this method, in order to reconstruct the original structure, all bitstreams must be input and the following problems arise:
1. Since all bitstreams are necessarily input for decoding data, in any event of a transmission error, all bitstreams must be retransmitted.
2. In the case when the magnitude of compressed data is large, it takes a long time to transmit the data completely and a user must wait during such a time.

To overcome the disadvantages of the conventional technology, the following functions must be satisfied.
1. Even if a transmission error is generated, only the portion having the transmission error need be retransmitted, thereby reducing the network load and the transmission time.
2. Restoration is allowed in which only a part of the data and triangles or polygons for the restored portion are processed to be displayed on a screen.

Implementation of these two functions while maintaining the basic structure of the conventional method proposed by I.B.M. Corp. depends on effective processing of the bounding loop and Y-vertex, as shown in FIG. 3. In order to calculate the Y-vertex in a restoration process, at least one of two branching triangle runs must be received. In FIG. 2F, points 10, 14 and 18 are Y-vertices. For triangles within a triangle run, indices for the three vertices of each triangle can be determined using the marching bit pattern and the bounding loop. However, in order to determined the indices of Y-vertices which are the third vertices of branching triangles, all bitstreams for another two triangle runs next to the branching triangles must be received. Therefore, the triangles next to the branching triangles cannot be restored to be displayed until subsequent bitstreams are received. This problem is not generated in the method proposed by I.B.M. Corp., which is based on the assumption that all bitstreams are received. However, in order to restore and display the triangles in the input order, this problem must be solved.

FIG. 6 is a conceptual block diagram of a conventional three-dimensional (3D) mesh information coding method. In FIG. 6, a 3D mesh object 100 is divided into connectivity, geometry and photometry and coded by a coding part 101 including a connectivity coder 102, a geometry coder 103 and a photometry coder 112. Here, vertex structure information 105 is transmitted from the connectivity coder 102 to the geometry coder 103. The information compressed by the connectivity coder 102, the geometry coder 103 and the photometry coder 112 is replaced to bitstream 111 compressed by an entropy coder 104.

The compressed bitstream 111 is input to a decoding part 112. In other words, the compressed bitstream 111 is divided into connectivity, geometry and photometry via an entropy decoder 106 to then be decoded by a connectivity decoder 107, a geometry decoder 108 and a photometry decoder 113, respectively. Like in the coding part 101, vertex structure information 109 is transmitted from the connectivity decoder 107 to the geometry decoder 108. A decoded 3D mesh object 110 can be constructed using the decoded connectivity, geometry and photometry.

In FIG. 6, a 3D mesh can be transmitted in forms of compressed bitstreams in a communication path. However, since the conventional MPEG data compression method employs the entropy coder 104, the method is weak against transmission errors generated in a communication path.

SUMMARY OF THE INVENTION

To solve the above problems, it is an objective of the present invention to provide a method for progressively coding/decoding 3D mesh information, by which a network load and a transmission time can be reduced by re-transmitting only a part where a transmission error is generated and the 3D mesh information can be progressively restored using connectivity, geometry and photometry of the transmitted part.

Accordingly, to achieve the above objective, there is provided a progressive coding method of three dimensional (3D) mesh information comprising the steps of: (a) dividing a 3D triangle mesh of a model into one or more connected components; (b) generating a vertex graph and a triangle graph for each of the connected components; (c) partitioning the vertex graph and triangle graph constituting the connected components into data partitions each capable of being independently decoded for the respective connected components and then coding the same; (d) coding geometry containing positions of vertices of triangles constituting each partition, and photometry containing color, normal and texture coordinate information, for the respective data partitions.

According to another aspect of the present invention, there is provided a progressive decoding method for receiving bitstreams coded by a progressive coding method comprising the steps of: (a) dividing input bitstreams into units of data partitions; (b) identifying the partition type of each of the data partitions; (c) if the data partitions contain vertex graphs, decoding the vertex graphs to generate bounding loops; (d) if the data partitions contain triangle graphs, decoding the triangle graphs to generate a 3D mesh; and (e) repeating the steps (a) through (d) to progressively generate 3D meshes.

BRIEF DESCRIPTION OF THE DRAWINGS

The above objectives and advantages of the present invention will become more apparent by describing in detail a preferred embodiment thereof with reference to the attached drawings in which:

FIGS. 4A through 4D illustrate an example of a topological surgery;

FIGS. 10A and 10B illustrate examples of a 3D mesh object (MO) and mesh object layers (MOL);

FIG. 11 is a conceptual diagram for the relationship between a triangle graph and a bounding loop index;

FIGS. 12A through 12D illustrate a fixed data partitioning method during a topological surgery process;

FIGS. 14A through 14D illustrate types of partitions in a variable data partitioning method;

FIG. 15 illustrate partitions by the variable data partitioning method;

FIG. 16 illustrates another example of partitions for large connected components in the variable data partitioning method;

FIGS. 18A through 18E illustrate examples of syntaxes in connection with partitioning in a polygonal mesh;

FIGS. 22A and 22B illustrate syntaxes in data partitioning in the case when indices of Y-vertices are given to a header;

FIG. 23 illustrates an indexing method of a bounding loop and a coding method of header information of the partitions produced thereby;

FIGS. 24A and 24B illustrate a coding method of start index information of a partition;

FIGS. 26A through 26C illustrate syntaxes for arranging data such as geometry, color, normal or texCoord information in partitioning the same;

FIG. 28 is a schematic diagram of the syntax of a partition.

DESCRIPTION OF THE PREFERRED EMBODIMENTS

The present invention will be described in detail with reference to the accompanying drawings.

Figure 7:
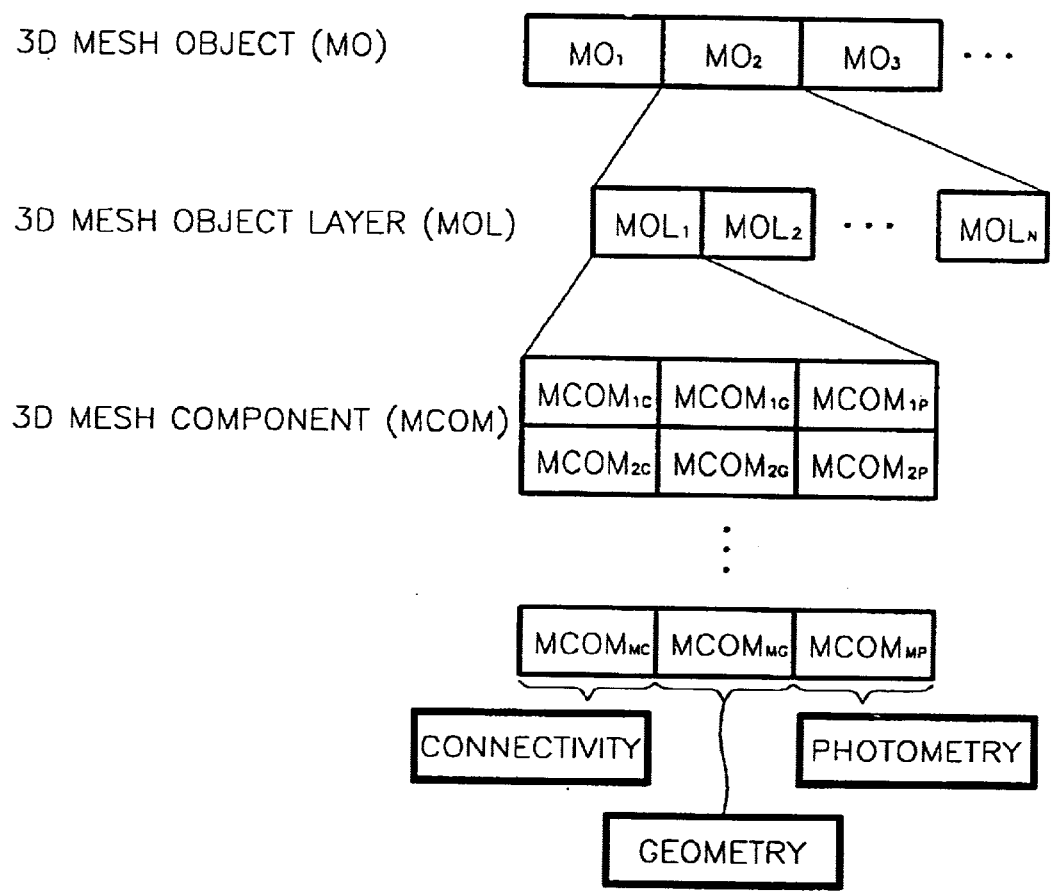
FIG. 7 is a conceptual diagram of progressive 3D mesh object information representation.

Firstly, for progressive processing of a 3D mesh object, in the present invention, a new mesh structure shown in FIG. 7 is proposed. As shown in FIG. 7, a 3D mesh object (MO) can be divided into several connected or non-connected components. The components contained in the 3D mesh object can be reconstructed as several mesh object layers (MOLs). Each MOL contains connectivity, geometry and photometry necessary for its own restoration. Here, the MOL contains one or more mesh components MCOMs. In other words, the MOL can be represented as a set of MCOMs. Here, the MCOM is an independent unit of information and treated as a basic processing unit of the connectivity, geometry or photometry.

Figure 1:
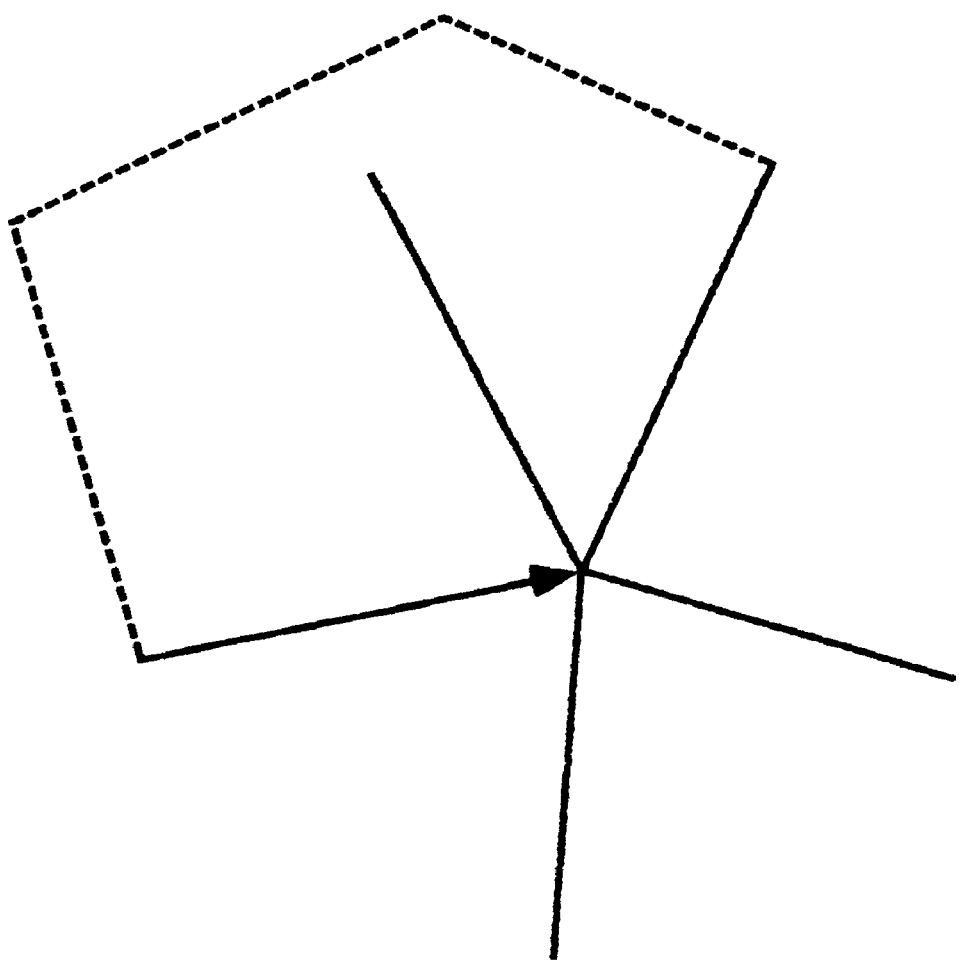
FIG. 1 illustrates an example of a vertex spanning graph in a topological surgery.
Figure 2A:
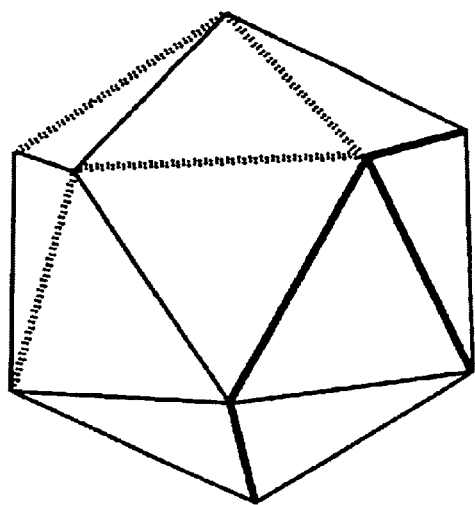
FIGS. 2A through 2F illustrate a conventional method for generating a vertex spanning graph and a triangle spanning graph in an example of a triangular mesh.
Figure 2B:
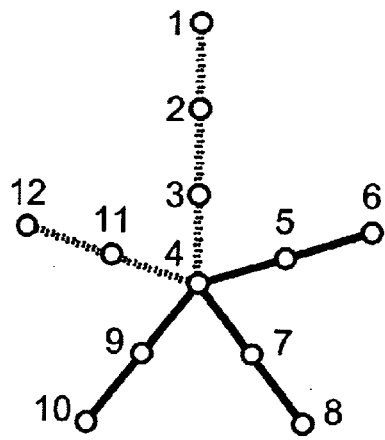
Figure 2C:
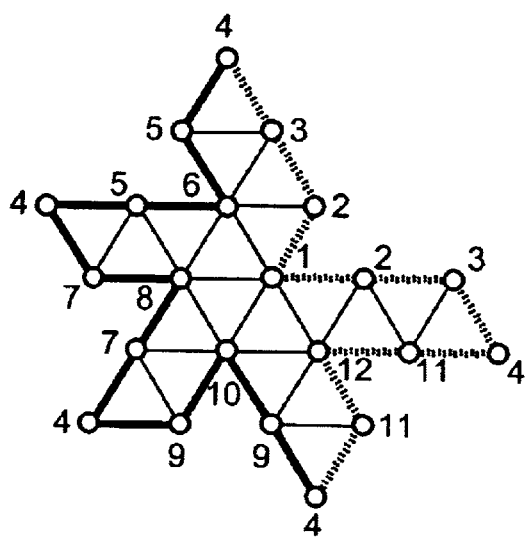
Figure 2D:
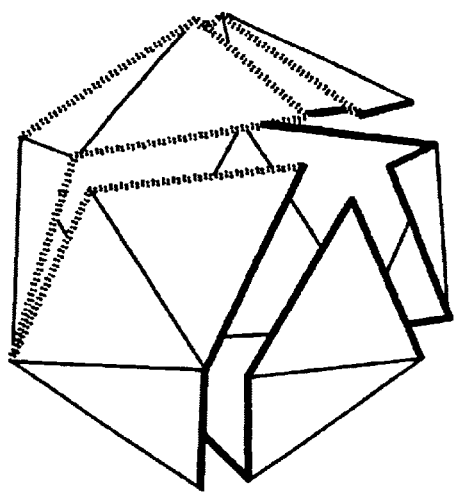
Figure 2E:
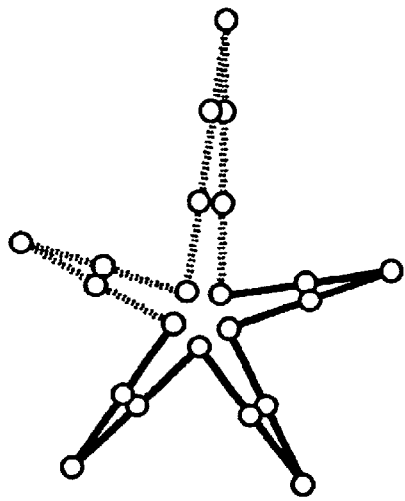
Figure 2F:
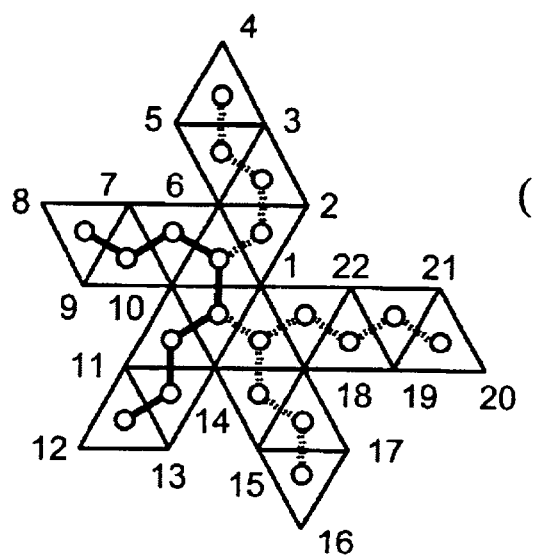
Figure 3:
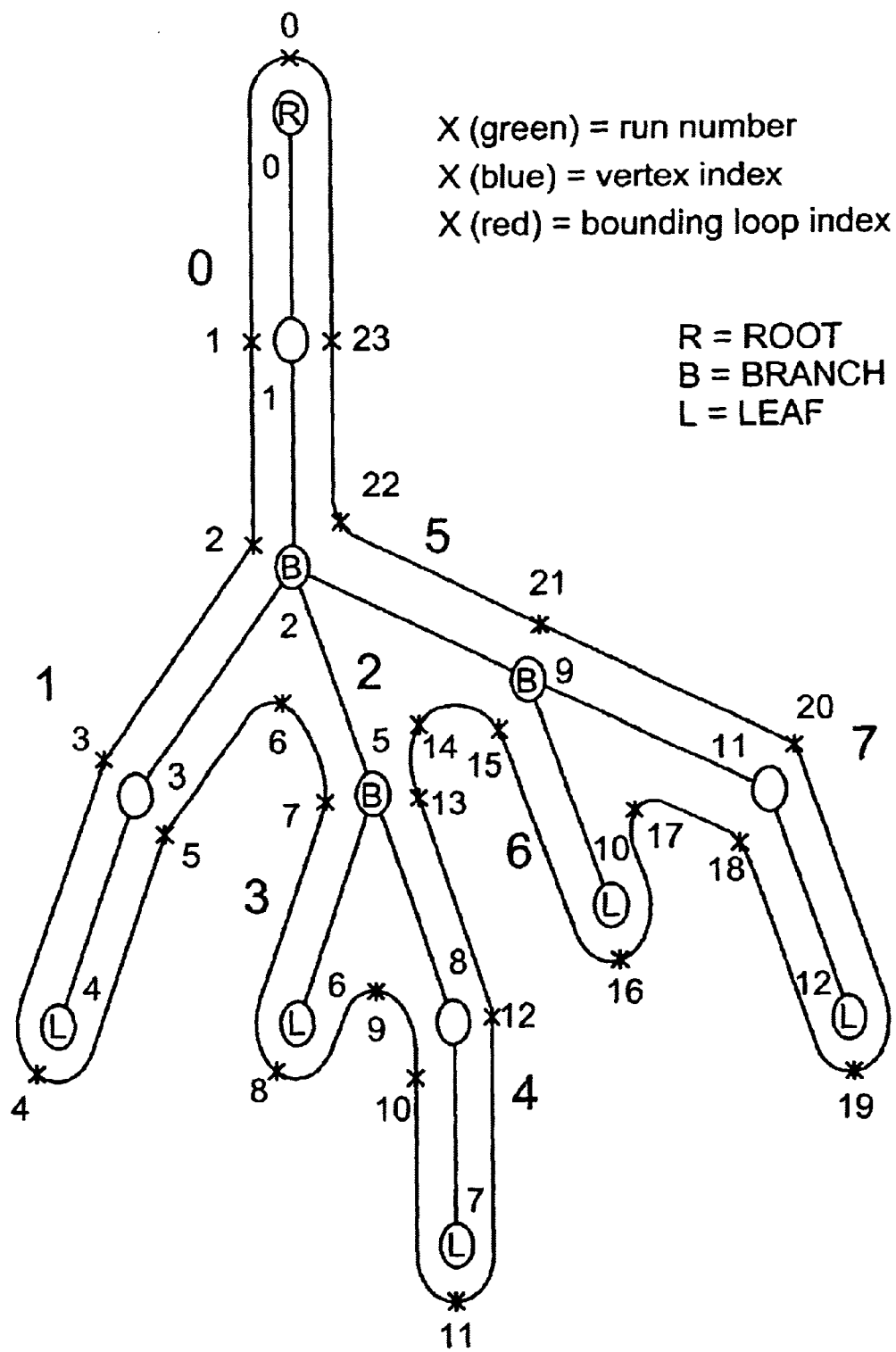
FIG. 3 illustrates a bounding loop in a topological surgery.
Figure 5A:
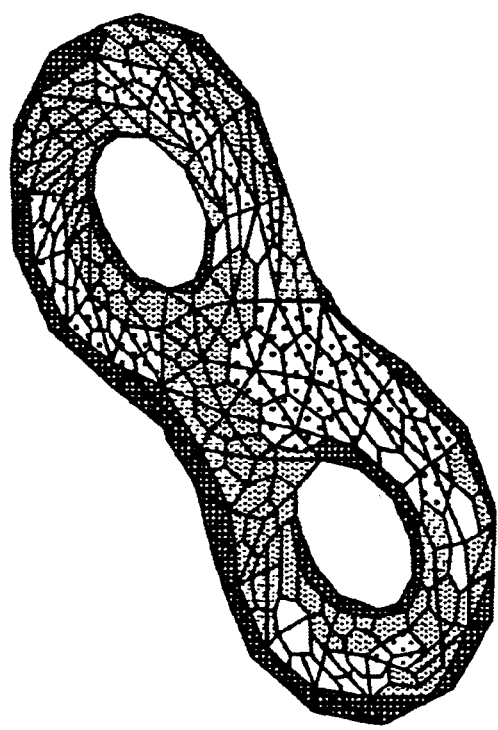
FIGS. 5A and 5B illustrate a polygonal mesh and an example of a dual graph thereof.
Figure 5B:
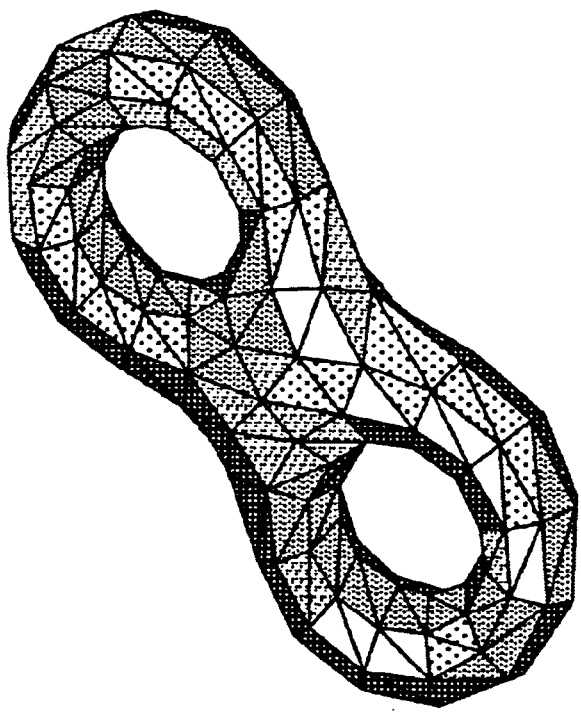
Figure 6:
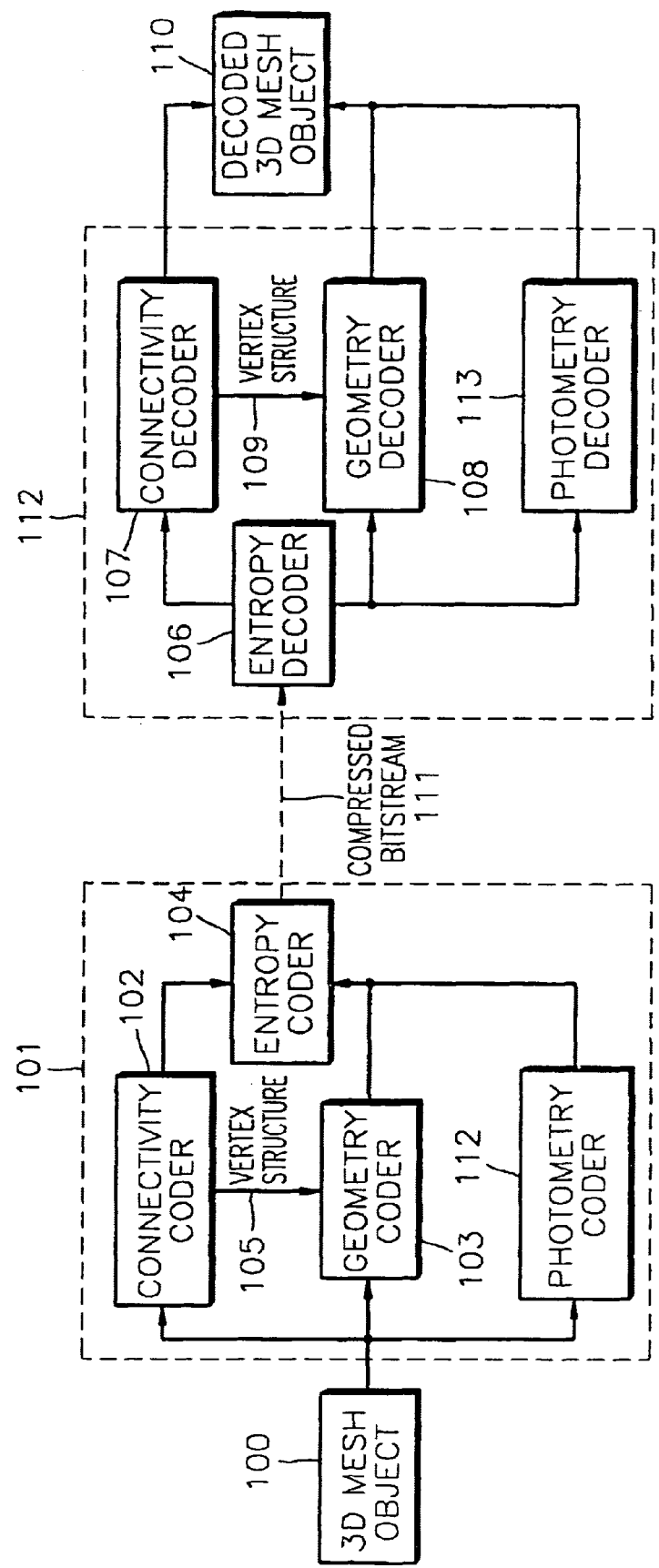
FIG. 6 is a conceptual diagram of a conventional three-dimensional (3D) mesh information coding method.
Figure 8:
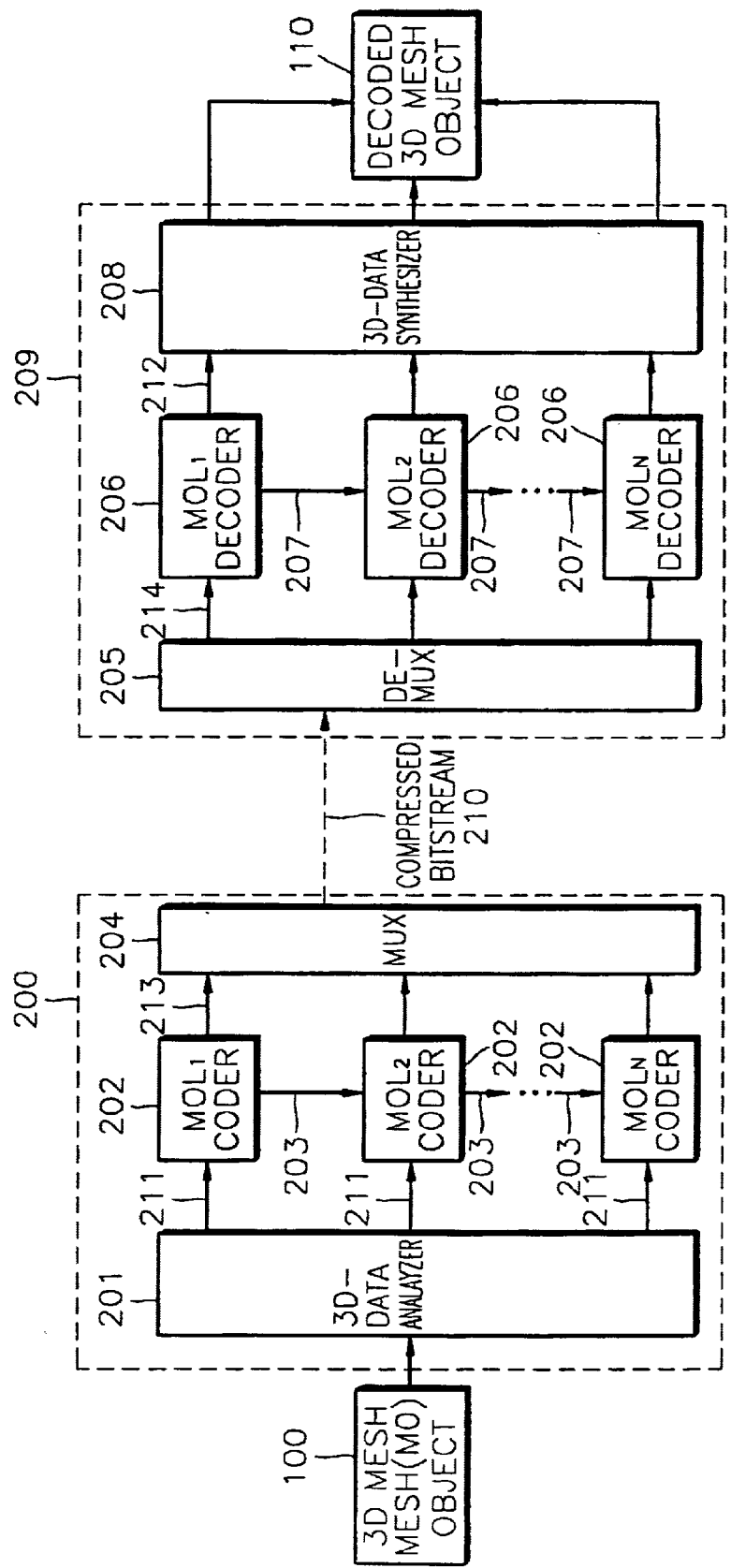
FIG. 8 is conceptual diagram of progressive 3D mesh object information coding method according to the present invention.

FIG. 8 illustrates a coding part and a decoding part for a 3D mesh object according to the present invention. Firstly, a 3D mesh object 100 is reconstructed into a mesh object layer (MOL) 211 by a 3D data analyzer 201 to then be input to a plurality of MOL coders 202. Each MOL coder 202 (corresponding to the conventional coding part 101 shown in FIG. 6) includes independent coding parts for connectivity, geometry and photometry. One MOL may be divided into several MCOMs to be transmitted. The transmission order is shown in FIG. 7. As shown in FIG. 7, the MCOM may be one of the connectivity, geometry and photometry and is coded in the order of the connectivity, geometry and to photometry. Here, the photometry may be omitted on occasion. Although the order of the connectivity, geometry and photometry may be reversed, it is preferable to form such information in a group in order to represent one MOL. There may be several groups according to the degree of division of the MCOMs (see FIG. 7). Here, a plurality of MOL coders may be provided. The information 203 used in an upper-level MOL coder is also used in a lower-level MOL coder. The MOL compressed by the MOL coder 202 is transmitted in the form of compressed bitstreams in units of MCOMs via a multiplexer (MUX) 204. The compressed bitstream 210 is divided into units of MOLs by a demultiplexer (DEMUX) 205 and each MOL is transmitted to an MOL decoder 206 of a corresponding layer. The MOL decoder 206 decodes the transmitted MOL into MCOMs. In the decoding procedure, the information 207 used in an upper-level MOL decoder is used again in a lower-level MOL decoder. The MOL decoded by each layer is restored into a 3D mesh object 110 by a 3D data synthesizer 208.

As described above, when the 3D mesh information within one connected component is partitioned to have a predetermined size to then be coded, the information which must be taken into consideration in view of the decoding part is required. In other words, when the decoding part receives and progressively restores some of the divided 3D mesh bistreams for rendering, if the restoration order of a triangle tree is fixed, it is impossible to decode the Y-vertex without knowing the information forming the triangle tree to the right. Thus, until untransmitted 3D mesh information are all obtained, the rendering for the progressive decoding operation cannot be further performed. Therefore, in order to progressively code/decode the 3D mesh information, the Y-vertex information which can provide the connectivity of the right tree at a branching point of a binary tree must be formed within a bitstream to be transmitted to the decoding part.

To this end, when the 3D mesh information within a connected component is divided so as to have a predetermined size, the connectivity of the Y-vertex is also formed to be coded for rendering. However, according to this method, the coding efficiency may be deteriorated due to additional information of the position and order of the Y-vertex. This problem may be caused by forming the tree in only a fixed direction and coding the same in the fixed direction and can be solved by adaptively varying the coding direction in which the connectivity is not necessary or minimally required when the Y-vertex is visited in the partitioned 3D mesh information.

Figure 9A:
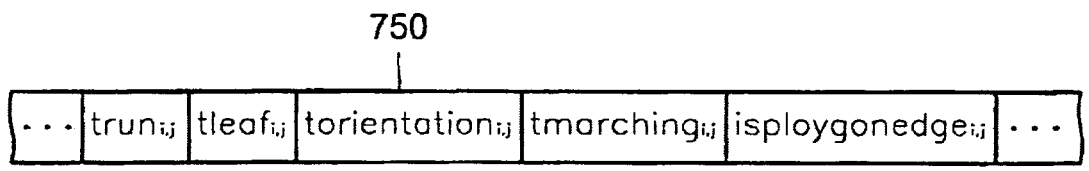
FIGS. 9A through 9C illustrate a method for determining an adaptive coding direction according to the present invention, for Y-vertex coding.
Figure 9B:
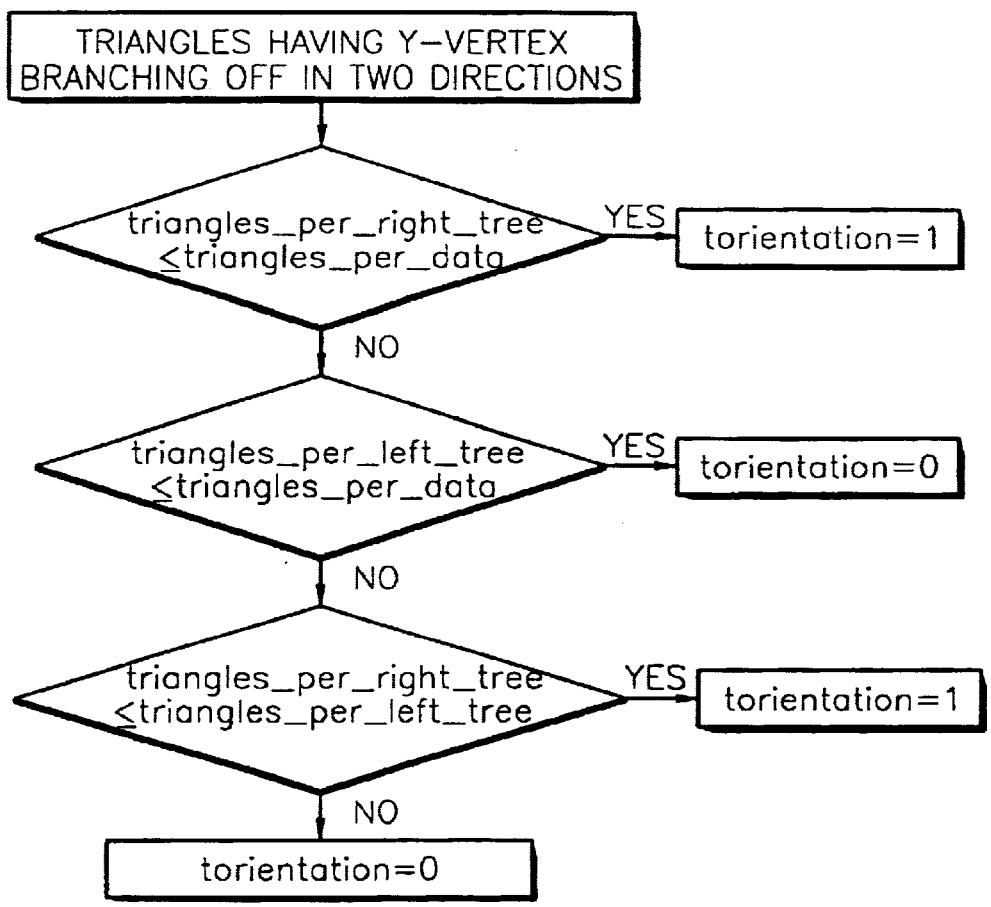

As shown in FIGS. 9A and 9B, in the present invention, when a triangle having a Y-vertex in a triangle tree is visited, the coding order of the triangle tree is sequentially determined based on triangles_per_data used when the triangle tree within a connected component is divided equally into units of a specific size triangles_per_right_tree for indicating the number of triangles in the right branch and triangles_per_left_tree for indicating the number of triangles in the left branch, and a torientation marker 750 for indicating the coding direction is provided.

In other words, if the torientation 750 is 0, in a state where the root is positioned above, a dependent triangle tree in the left branch (i.e., counterclockwise) is first coded. If the torientation 750 is 1, in a state where the root is positioned above, a dependent triangle tree in the right branch (i.e., clockwise) is first coded. Also, even if a triangle having a Y-vertex is visited within a dependent triangle tree whose coding orientation is determined, the coding orientation is not indicated.

Figure 9C:
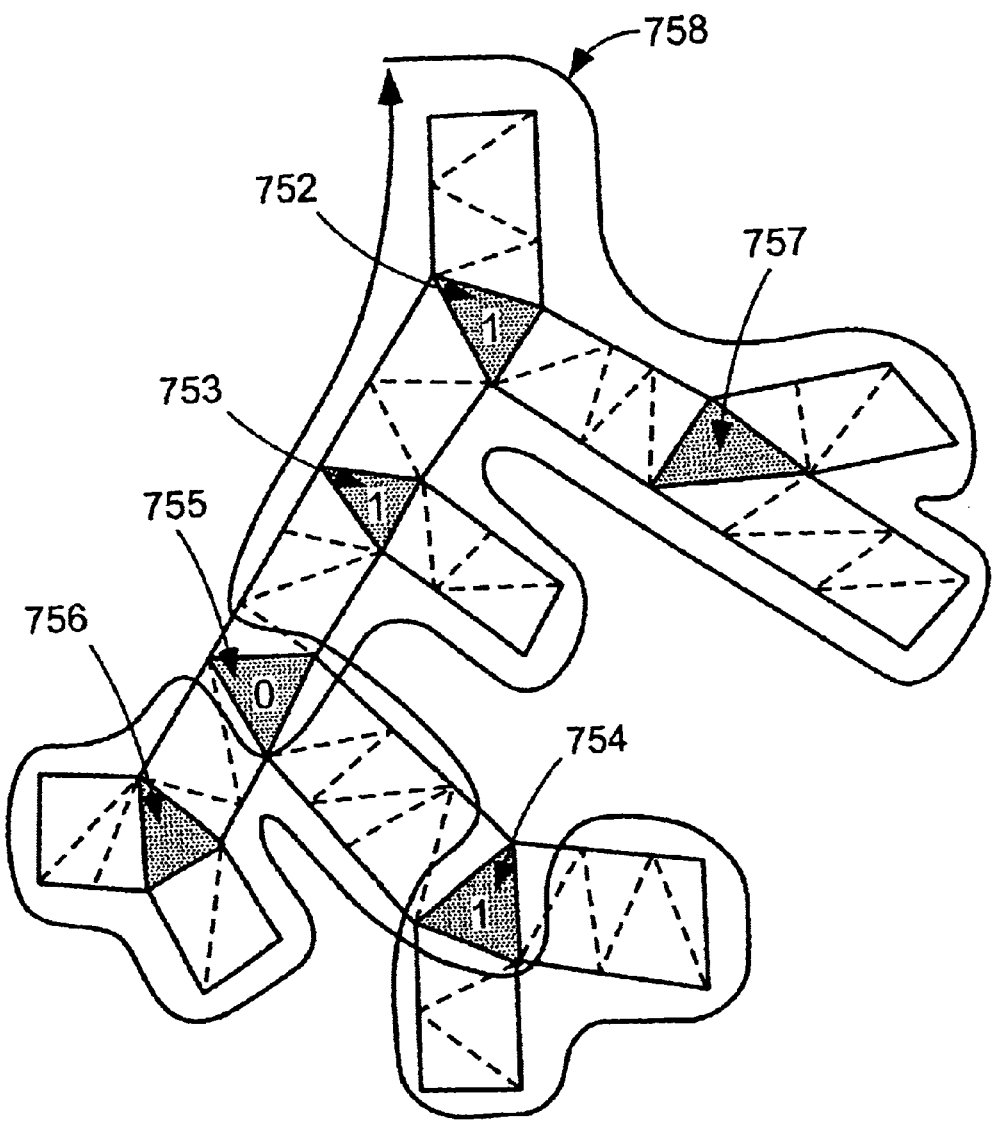

An example of the procedure of generating torientation which is an orientation marker by the above-described coding orientation determining method is shown in FIG. 9C, in which reference numerals 756 and 757 denote triangles having Y-vertices in a dependent triangle tree whose orientation marker is already determined. Thus, the orientation marker is not defined. Reference numeral 758 denotes the order of transmitting and rendering compressed bitstreams of 3D mesh information to the decoding part. In other words, the feature that the total number of leaf triangles within the dependent triangle tree is the same as the sum of the numbers of triangles with an orientation marker and triangles without an orientation marker and with Y-vertices, is used as a determination condition.

FIG. 10A illustrates a 3D mesh object (MO) and FIG. 10B illustrates mesh object layers (MOL).

Firstly, the information necessary for restoring a triangle mesh will be summarized as follows.

FIG. 11 is a conceptual diagram for the relationship between a triangle graph and a bounding loop index. In FIG. 11, reference character m denotes a right start index, n denotes a left start index and a central arrow denotes the order of triangles coded. Here, based on the marching direction, the boundary positioned on the right of the triangle strip is a right boundary, the boundary positioned on the left of the triangle strip is a left boundary, and the gray triangle inside is a branching triangle.

As shown in FIG. 11, it is assumed that indices in the bounding loop for starting points of the left and right boundaries are given in a partition of the triangle graph. Then, the following information is necessary for the respective triangles of each triangle graph.

Triangle Prior to Branching Triangle

As shown in FIG. 11, in the case of triangles prior to a branching triangle, indices of the bounding loop increase by one in the left boundary and decrease by one in the right boundary. Thus, whenever a marching bit is decoded, three vertices of the triangle can be immediately restored.

Branching Triangle

In FIG. 11, a branching triangle is composed of three vertices b[m−3], b[m−10] and b[n+2]. However, if the triangle information of the right branch in the branching triangle, that is, the information on the number of triangles, is not received, it is not possible to know the index m−10 in the bounding loop of the third vertex, i.e., Y-vertex. Thus, in order to determine the index of the Y-vertex, the information on the number of triangles in one of the side branches must be received. In order to know the number of branches on one side, the information on the triangle run in the triangle graph is necessary. In FIG. 11, if the number of triangles of the right branches is p, the number of vertices used can be easily known as follows:

number of vertices used in one side branch=$p+2$.

Thus, in FIG. 11, the indices of the bounding loop of the third vertex, i.e., Y-vertex, of the branching triangle can be determined using the fact that the index of the vertex on the right boundary is m−3 and that the number of triangles in the branch is 6, as follows:

Index of $Y\text{-vertex}=(m-3)-(6+2-1)=m-3-7=m-10$.

Triangles in the Branch Branching from the Branching Triangle

In this case, if the Y-vertex of the branching triangle is not determined, the indices of the vertices of the triangle cannot be determined. This is because the indices of the vertices positioned on the left boundary cannot be determined if the Y-vertex in the right branch shown in FIG. 11 is not determined.

As described above, for progressive rendering, as the result of data partitioning, the Y-vertices must be effectively determined. Therefore, in the present invention, a method which allows independent restoration and rendering of partitioned data is proposed.

Data partitioning methods are largely divided into two methods, that is, a fixed partitioning method and a variable partitioning method. While the fixed partitioning method employs one identical partitioning method throughout overall given models, the variable partitioning method employs different partitioning methods according to types of bitstreams covered by the data partitioning, that is, vertex graph, triangle tree, triangle data and the like.

<Fixed Partitioning Method>

Figures 12A, 12B, 12C, 12D:
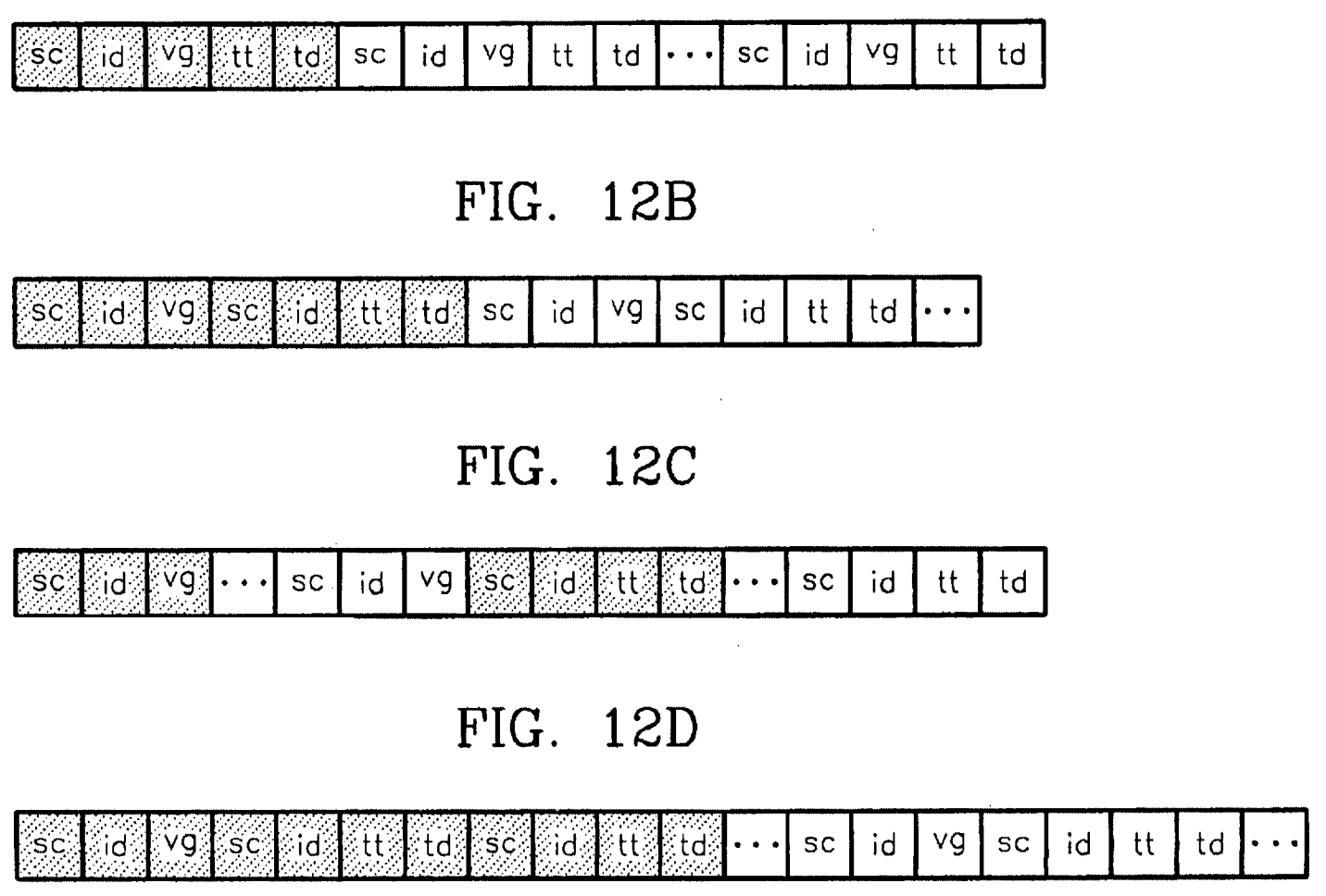

FIGS. 12A through 12D illustrate a fixed data partitioning method during a topological surgery process, proposed in the present invention, in which reference character 'sc' denotes a start code, 'id' denotes an identifier of a partition, 'vg' denotes a vertex graph, 'tt' denotes a triangle tree, and 'td' denotes triangle data. FIG. 12A shows dividing one connected data into one unit of data, FIG. 12B shows dividing the vertex graph and triangle graph within one connected data into one unit of data.

The information obtained through the topological surgery is partitioned into units of meaningful data in the above-described manner. Transmitting data units partitioned in such a manner has the following advantages:

Even if all the data is not transmitted, progressive restoration in units of transmitted data is allowed.

Even if an error is generated during transmission, the data without error can be immediately restored without being retransmitted, thereby reducing the standby time of a user.

By retransmitting only the data having an error, the load of a network can be reduced.

Now, the data partitioning method will be described.

1. Data Partitioning Method in Units of Connected Components

FIG. 12A shows the data partitioning method in units of connected components. This method can be easily implemented and is effective for a case in which a difference between, connected components is not great. However, if the sizes of connected components are not uniform and the difference between the components is large, the sizes of data partitions becomes non-uniform. Also, if the size of one connected component is large, the efficiency is lowered.

2. Partitioning Method for Combining Small Connected Components

If many connected components whose sizes are small are contained within a model, the amount of bits increases, which is not effective. To avoid this, the connected components whose sizes are small are collected into one component and then each component is coded into an independent partition.

3. Partitioning Method for Combining Large Connected Components

To solve the ineffectiveness of the above-described two methods in the case of large connected components, as shown in FIGS., 12C and 12D, the connected components themselves are partitioned. In other words, FIG. 12C shows that the information of the vertex graphs of all connected components belonging to one model as shown in FIG. 12A is partitioned, the information of the triangle graphs is collected, and then coding is performed using the triangle graphs as independent data partitions. FIG. 12D shows that the triangle graph shown in FIG. 12B is divided into several partitions and then coded.

Figure 13A:
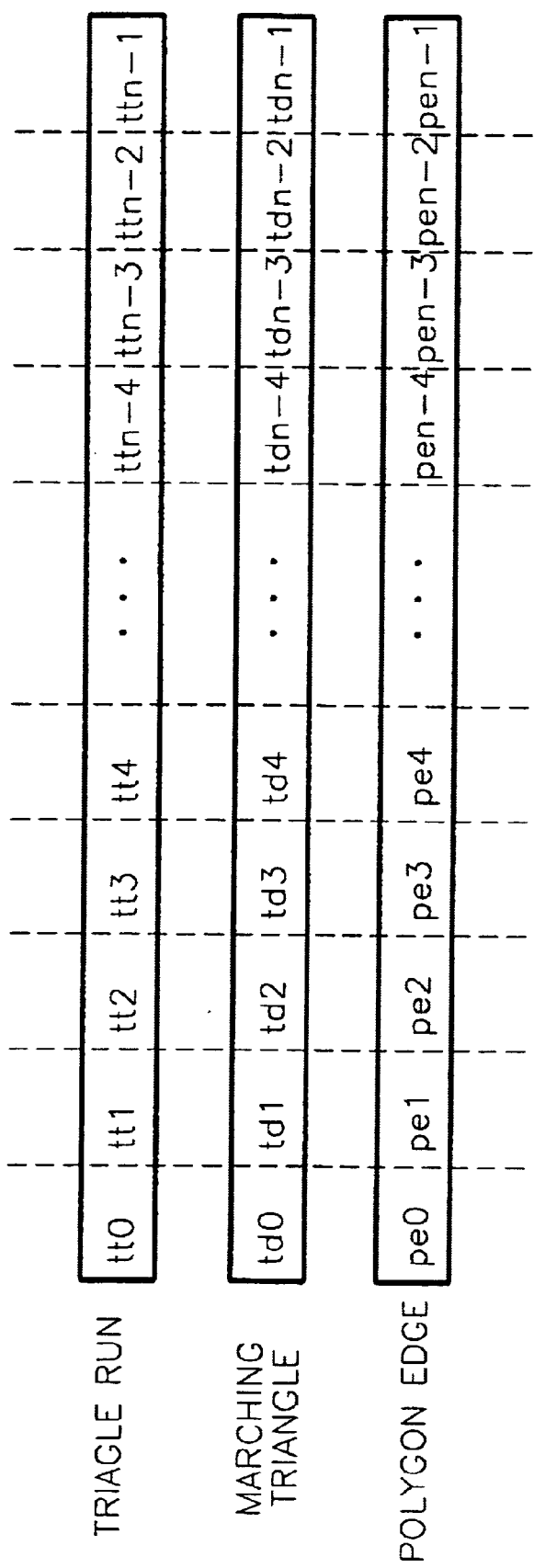
FIGS. 13A through 13B are conceptual diagrams of data partitioning according to the present invention.
Figure 13B:
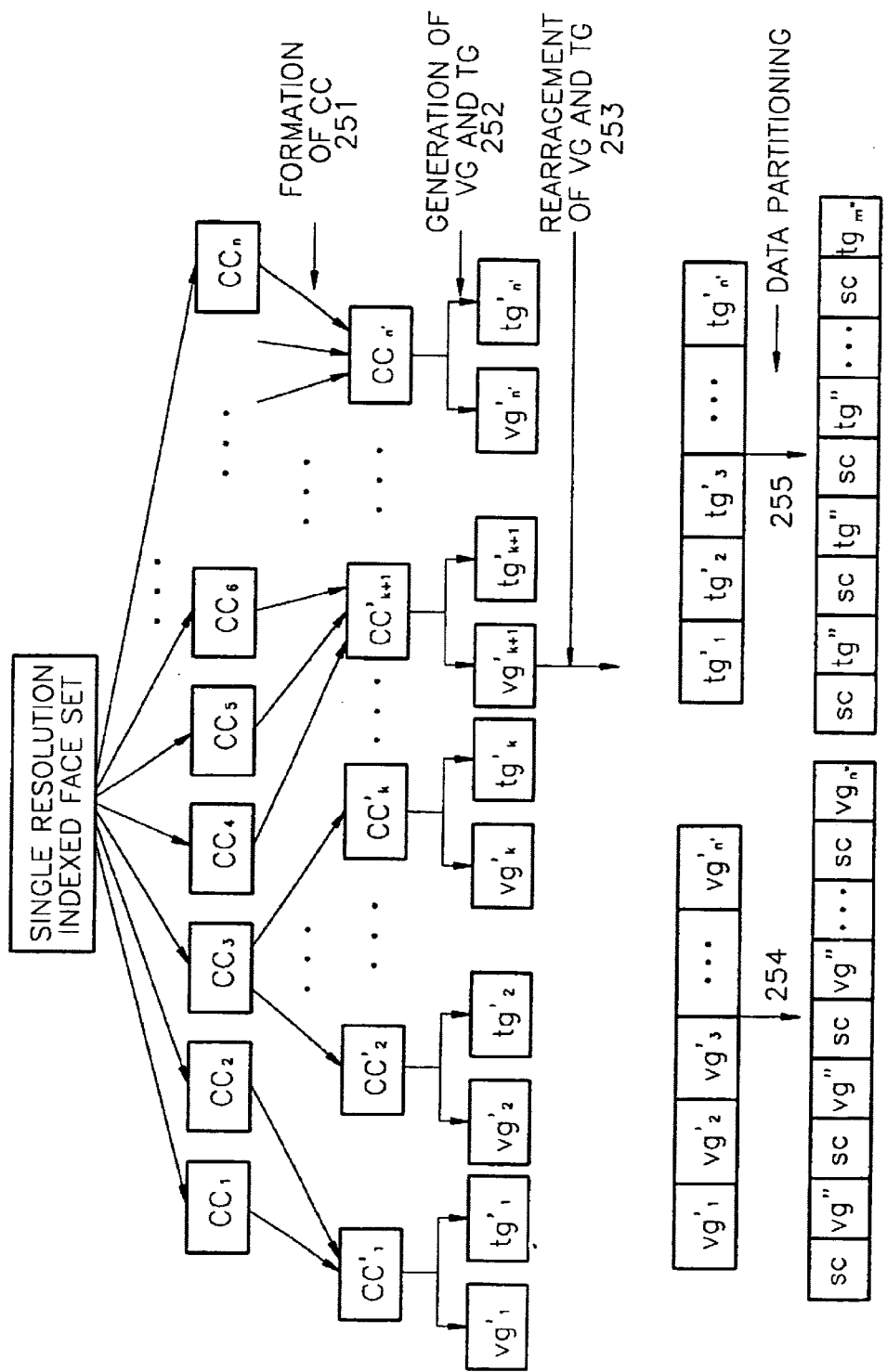

FIGS. 13A and 13B are conceptual diagrams of data partitioning according to the present invention. In FIG. 13B, reference character 'VG' denotes a vertex graph, reference character 'TG' denotes a triangle graph, 'vg' denotes vertex graph data, and 'tg' denotes triangle graph data. Also, although 'id' information is not shown in FIG. 13A for convenience's sake, it must come after the start code. FIG. 13A illustrates a triangle graph, including a triangle run, a marching triangle and a polygonal edge during a data partitioning procedure, and FIG. 13B illustrates a data partitioning procedure utilizing the fixed data partitioning method.

In FIG. 13B, the subscript n denotes the number of connected components (CC) and n' denotes the number of reformatted components in the case of reformatting according to the sizes of connected components. The reformatting is performed in the following manner.

1. Reconstruction of Connected Components (Step 251)

Small connected components are combined to be included in the range of a predetermined data partition size. As shown in FIG. 13B, connected components $CC_1$ and $CC_2$ are combined to form reformatted component $CC'_1$. The connected components larger than the data partitions are partitioned into small components. In FIG. 13B, the third connected component $CC_3$ is partitioned into several components $CC'_2, \ldots, CC'_k$.

2. Generation of Vertex Graphs and Triangle Graphs (Step 252)

Pairs of vertex graphs and triangle graphs are generated for the respective reformatted components.

3. Rearrangement of Vertex Graphs and Triangle Graphs (Step 253)

Vertex graphs generated in the step 252 are rearranged into a vertex graph information and triangle graphs are rearranged into a triangle graph information.

4. Partitioning of Vertex Graph Information (Step 254)

The vertex graph information rearranged in the step 253 is partitioned into units of information having a predetermined size.

5. Partitioning of Triangle Graph Information (Step 255)

The triangle graph information generated in the step 253 is partitioned into units of information having a predetermined size.

<Variable Partitioning Method>

To perform data partitioning, the following must be taken into consideration.

As in the present invention, for error resilience, data partitioning is performed and a start code is given to each partition.

If data is partitioned, the number of bitstreams increases, compared to the case when data is not partitioned.

A start code cannot be selectively inserted. In other words, since data partitioning is performed for supporting error resilience, insertion of a start code cannot be omitted even if the error resilience is not supported.

Thus, even if it is not necessary to support error resilience, since the start code is unnecessarily inserted and then coded, the bit quantity dramatically increases.

To avoid the above problems, the fixed partitioning method may be adopted. Then, even if it is not necessary to support error resilience, the start code must be inserted into the same position as in the case of supporting error resilience, which unnecessarily increases the bit quantity. To solve this problem, the variable partitioning method is adopted, instead of the fixed partitioning method.

FIGS. 12A through 12D show types of partitions in the variable partitioning method, in which reference character 'sc' denotes the start code, 'tt' denotes a triangle tree, 'td' denotes triangle data, 'pt' denotes the type of a present partition and 'id' denotes an identifier of a partition. Also, in FIG. 14D, 'vi' denotes visiting indices, which are indices in the bounding loop for the first vertex of the restored triangle strip boundary when the present partition is restored, and are given as a pair of start indices of the left and right boundaries. FIG. 14A shows that vg, tt and td are sequentially contained in a data partition, FIG. 14B shows that only vg is contained in a data partition, FIG. 14C shows that a pair of tt and td are contained after vg, and FIG. 14D shows that tt and td are contained. That is to say, the types of data partitions are classified into four types according to the contents of bitstreams constructing a data partition, i.e., a vertex graph, a triangle tree or triangle data, as shown in FIGS. 14A through 14D.

The variable partitioning method is implemented by the following procedure.

A start code is inserted at the start of each partition.

The information of a partition type is coded, following the start code. Different values are given to this information according to the types of information contained in the data partitions.

The data such as a vertex graph, a triangle tree or triangle data can be covered partially or entirely in a partition.

In an embodiment of the present invention, as shown in FIGS. 14A through 14D, four types of partitions are used. Thus, in this embodiment, the partition type (pt) is defined using 2 bits, and the meanings of the bit values are shown in Table 1.

TABLE 1

Partition type in variable partitioning method

| Bit value | Meaning |
|---|---|
| 00 | One or more of vg, tt and td are sequentially contained. |
| 01 | Only vg is contained and the vg data is used in one or more MOCs. |
| 10 | vg, tt and td construct one MOC and vg is used in one or more MOCs. |
| 11 | tt and td are contained, and vi which is a starting point of a triangle strip is contained in header information for restoring tt and td. |

FIG. 15 illustrates an example of partitioning using a variable partitioning method, in which four connected components are shown. From each connected component (CC), a pair of vg and tg can be obtained. In FIG. 15, since the sizes of three precedent CCs are small, the respective CCs constitute one partition to then be coded using the third partition type shown in Table 1. However, since the fourth CC is too large to be coded in one partition, it is split into four partitions. The first partition is coded using the third partition type shown in Table 1, and the second, third and fourth partitions are coded using the fourth partition type.

The partitioning methods for large connected components shown in FIGS. 15 and 16, have the following differences therebetween.

If only vg is separately coded as shown in FIG. 16, sc and vi must be coded for the first subsequent pair of tt and td, which increases the bit quantity.

If pairs of tt and td as well as vg are coded as shown in FIG. 15, the data partition becomes larger, which increases the quantity of bits to be retransmitted in the case when a transmission error is generated.

Therefore, it is important to determine whether only vg is to be contained in the partition or both tt and td are to be contained in the partition. In consideration of the bit quantity, it is desirable to code pairs of tt and td as well as vg in the same partition.

<Data Partitioning in Polygonal Mesh>

Figure 17:
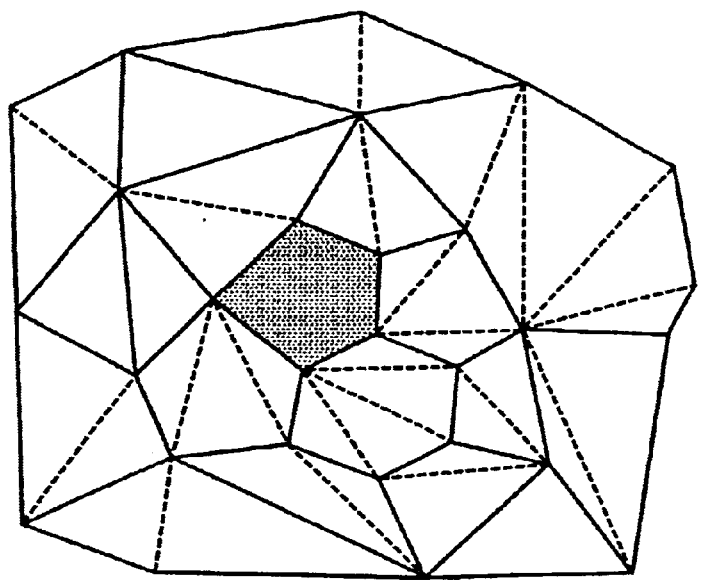
FIG. 17 illustrates an example of formation of a triangular mesh from a polygonal mesh.

In the topological surgery, in order to code mesh information composed of polygons, polygonal information is first reconstructed into a triangle mesh. FIG. 17 illustrates an example of formation of a triangle mesh from a polygonal mesh, in which solid lines represent edges of the original polygonal mesh and dotted lines represent virtual edges added for dividing a polygon into triangles.

Since virtual edges are added for dividing a polygon into triangles, they are restored in the decoding part so that the information for restoring the original polygon is transmitted. The information is referred to as polygonal edge information. Thus, for one triangle, one kind of polygonal edge information is transmitted.

An actual edge is coded with a value of 1; and otherwise, the edge is coded with a value of 0.

According to the conventional method, the polygonal edge information corresponding to the number of triangles produced by reconstructing a polygon mesh into a triangle mesh is generated, and then the generated information is coded and transmitted /stored. However, since the first triangle must start with an actual edge, the corresponding polygonal edge information has a value of 1 all the time. Thus, the first triangle is not coded. In this case, the first triangle is decoded by the decoding part, with the assumption that the polygonal edge information has a value of 1.

FIGS. 18A through 18E illustrate examples of a partitioning method in a polygonal mesh and the method, in which reference character 'tt' denotes triangle run information, 'tm' denotes marching information, 'pe' denotes polygonal edge information, subscripts denote the order of tm and pe corresponding to tt, and 'n' denotes the number of triangles. FIG. 18A shows the original polygonal mesh, FIG. 18B shows partitioning within a polygon, FIG. 18C shows partitioning between polygons (actual edge), FIG. 18D shows syntaxes in the case of cutting a polygonal mesh at actual edges, and FIG. 18E shows syntaxes in the case of cutting a polygonal mesh at virtual edges.

If data partitioning is performed, as shown in FIG. 18B, partitioning may occur at a virtual edge, not an actual edge, that is, within a polygon. In such a case, since the assumption that the polygonal edge value starts with a value of 1 within a data partition all the time cannot be established, the polygonal edge information corresponding to the number of triangles must be coded. However, as shown in FIG. 18C, if data partitioning occurs at actual edges, that is, the boundary between polygons, the edge value of the first polygon is always 1, which means that it is not necessary to code the same.

In the case of a polygonal mesh, the polygonal edges in each partition are processed as follows:

1. When partitioning at virtual edges is not permitted, the edge value of the first polygon within a partition is not coded. In the present invention, it is basically assumed that partitioning occurs only at actual edges; and 2. When partitioning at virtual edges is permitted, the edge value of the first polygon within a partition is coded. Here, since the polygonal edge value of the first partition is 1, coding is not performed thereon.

<Data Partition of a Triangle Graph>

For partitioning a triangle graph, in the present invention, data partitioning is performed at a position where the triangle information of the left (or right) branch of a branching triangle appearing for the first time from the end of the previous partition, is entirely received.

Figure 19:
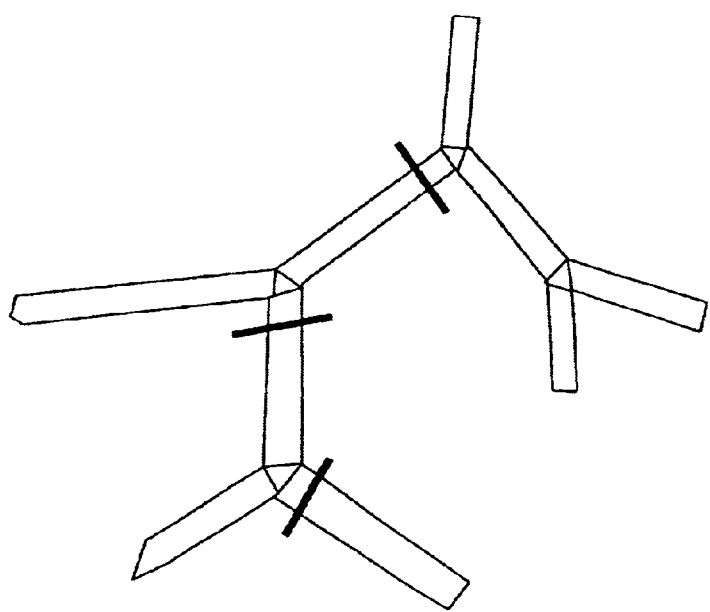
FIG. 19 illustrates data partitioning in a main branch.

FIG. 19 illustrates an example of data partitioning in a main branch. The reason of partitioning a triangle graph in this manner is because it is impossible to restore and render a triangle following the corresponding branching triangle if the indices of the Y-vertices are not determined. However, if data partitioning is allowed only at the main branch as described above, it is possible to determine the indices of the Y-vertices within one partition. However, this method may not be effective according to a predetermined traversing order and the type of the actual triangle graph. In other words, in the case of coding the left (or right) branch first, if the left branch is considerably larger than other triangles branching in the triangle graph, the size of the data partition will exceed an appropriate level. Also, in order to determine the Y-vertex, a standby time is necessary until the information following after the branching triangle, i.e., the information of the number of triangles of either side branch, is processed.

<Method for Determining the Coding Order in Branching Triangle>

In the conventional topological surgery, the coding order is fixed with respect to the overall triangle graphs. However, if the coding order is fixed with respect to the overall triangle graphs, the size of the branch to be coded first may be excessively large. If the sizes of two branching branches are not uniform, it is more effective to code the smaller branch to determine the Y-vertices. By doing so, the Y-vertex can be determined quickly and rendering can be facilitated. Thus, if the data is partitioned with a fixed coding order, effective determination of the Y-vertex cannot be achieved, which obstructs progressive restoration and rendering of polygons.

In practice, if the data is obtained through the topological surgery shown in FIGS. 4A through 4D, the number of triangles of one side branch may be smaller than that of the other side branch. Therefore, the traversing order information, which is not defined in the topological surgery, is given in the present invention. In other words, if the orientation information is "1", the traversing order is the same as that is given initially. Thus, the left (or right) branch is first visited. Otherwise, if the orientation information is "0", the right (or left) branch is first visited. By providing such information, the branch having a smaller size is first decoded and the effect of progressive rendering can be expected as the result of data partitioning. Since data can be partitioned with a constant size determined initially by additively providing the orientation information, in any event of a transmission error, the size of data to be retransmitted can be reduced.

Figure 20A:
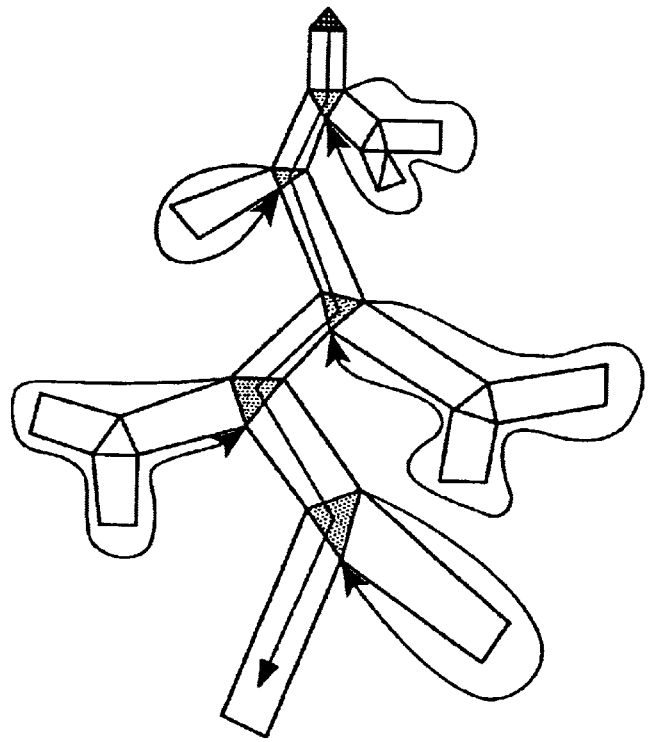
FIGS. 20A through 20D are conceptual diagrams of coding utilizing orientation information.
Figure 20B:
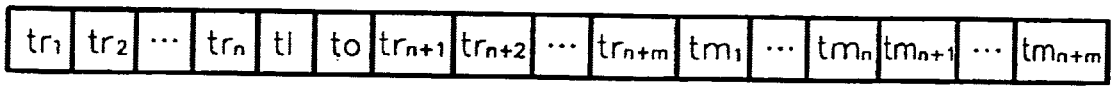
Figure 20C:
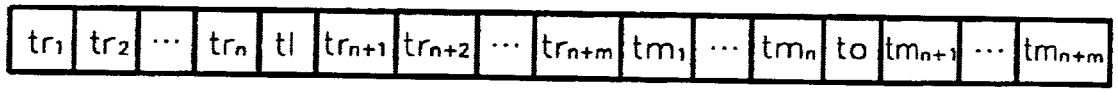
Figure 20D:
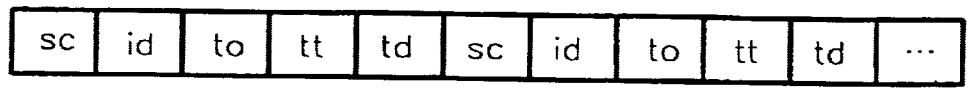

FIG. 20A is a conceptual diagram of coding utilizing orientation information, in which shaded triangles are branching triangles and arrows indicating the right or left side of the bounding loop represent directions of mapping indices of the bounding loop with respect to the first coded branches from the branching triangles. In FIGS. 20B through 20D, reference character 'tr' denotes a triangle run, 'tl' denotes tleaf information, 'to' denotes orientation information, 'tm' denotes marching information, and 'id' denotes the identifier of a partition. FIG. 20A shows a method for changing the traversing order for orientation, FIG. 20B shows the arrangement of orientation information in a triangle run, FIG. 20C shows the arrangement of orientation information in triangle data, and FIG. 20D shows the arrangement of orientation information in a partition.

Figure 21A:
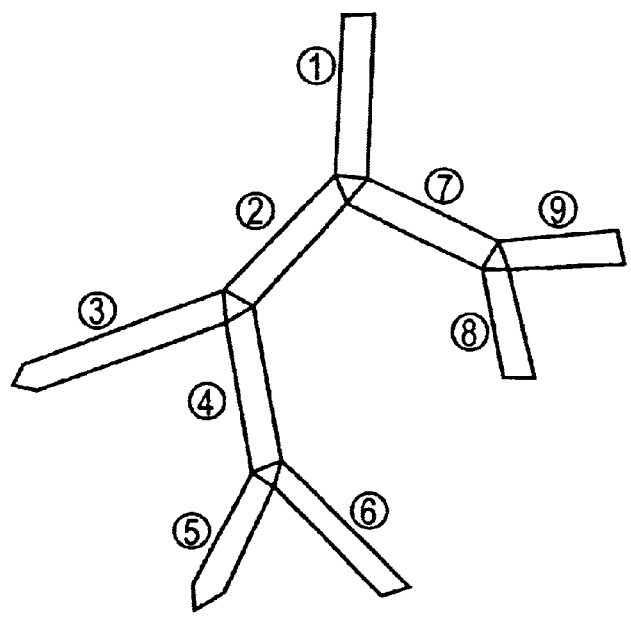
FIGS. 21A and 21B are diagrams for comparing the traversing order of the conventional method with that of the present invention, that is, when the orientation information is given.
Figure 21B:
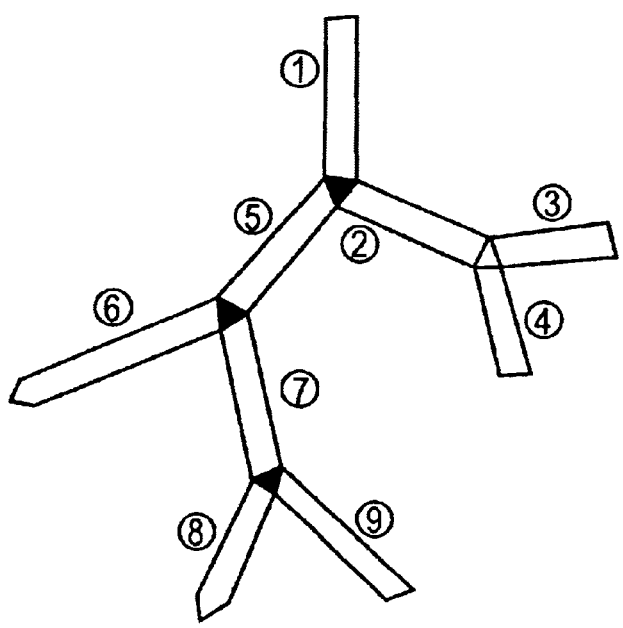

FIGS. 21A and 21B are diagrams for comparing the traversing order of the conventional method with that of the present invention, that is, when the orientation information is given, in which reference numbers represent the traversing order. FIG. 21A shows the traversing order in the conventional topological surgery, and FIG. 21B shows the traversing order in accordance with the sizes of branches of either side of the branching triangles. In FIG. 21B, black triangles are branching triangles to which orientation information is given. If the number of triangles of either side branch in the branching triangles is known, the Y-vertices can be determined. Thus, if the orientations in one data partition are identical, the Y-vertices can be determined by providing only one kind of orientation information to the header of each partition.

<Decoding and Rendering of Partition-independent Data in Event of Error Generation (Error Resilience)>

If a data partition having an error is discarded, decoding or restoration of subsequent data partitions may be impossible. Thus, the data partition having an error must be transmitted again. Otherwise, all of the data partitions following the data partition having an error must be discarded. To avoid such ineffectiveness, the respective data partitions must be independently restored or rendered. To this end, the starting positions on the bounding loop, from which the respective data partitions start, must be given, and the indices of Y-vertices must be independently determined in the data partition.

The decoding part decodes a vertex graph first. Here, the values of the respective vertices of triangles to be restored next are stored in a bounding loop table. Thus, in order to restore a triangle exactly to be rendered, it is necessary to know where the information of each vertex of a triangle is mapped in the bounding loop table. If the indices of the vertices of the first triangle of a data partition in the bounding loop are determined, the vertex of the next triangle can be determined by increasing the index of the bounding loop table by 1. Thus, if the indices of the vertices of the first triangle of a data partition in the bounding loop are given, it is possible to restore polygons independently from the other data partitions.

FIG. 11 illustrates the relationship between triangles and bounding indices during a restoration process. Since the indices for geometry of actual vertices are mapped in the bounding loop, the coordinates of the vertices of a triangle can be determined if the indices of the bounding loop are known. Here, the data partition may contain branching triangles, as shown in FIG. 11.

In order to determine the Y-vertices, two methods are proposed in the present invention.

Firstly, all branches of one side are contained in the branching triangles and data is partitioned only in a main branch. FIG. 19 shows an example of cutting data in the main branch.

Secondly indices of Y-vertices in the bounding loop are directly indicated in the header. In FIG. 11, a value of m−10 is given to the header.

FIGS. 22A and 22B illustrate syntaxes in data partitioning in the case when indices of Y-vertices are given to a header, in which reference character L denotes the index of the first vertex in the bounding loop on the left boundary of a triangle strip, R denotes the index of the first vertex in the bounding loop on the right boundary of a triangle strip, n denotes the number of Y-vertices appearing in a data partition, and $Y_i$ denotes indices of Y-vertices in the bounding loop. FIG. 22A shows an example of a syntax in the case of data partitioning in a main branch, and FIG. 22B shows an example of a syntax in which data partitioning is performed at an arbitrary position and Y-vertex information is contained in a header.

<Determination of Indices>

As described above, in order to decode and restore data contained in a partition independently of another partition, left and right indices corresponding to starting points of the boundary of a triangle strip in the bounding loop are indicated in the partition. When bitstreams are sequentially received like in a storage medium such as a compact disc, it can be assumed that only bit values are changed. In such a case, since indices of the bounding loop range from 0 to a level within a predetermined size for each connected component, the index given to the corresponding portion of the partition can be coded into a value being with this range, which is allowed because the bounding loop exactly matches the triangle graph and a triangle graph is always coded after a vertex graph. However, according to the characteristics of transmission media, the transmission order and the reception order may differ due to a transmission delay. Also, a loss of bitstreams may be generated. In such cases, since it is not assured that the vertex graph corresponding to the triangle graph is received properly, an index different from the former index must be given.

FIG. 23 illustrates the relationship between a bounding loop and triangle graph data in the case of several connected components. The first column shows examples of independently indexing each connected component in the bounding loop and the second column shows examples of indexing the last value of the previous bounding loops being incremented continuously, in the bounding loop.

FIGS. 24A and 24B illustrate a coding method of the start index information of a partition, in which $n_1$ represents the size of the bounding loop of the first connected component and $n_2$ represents the size of the bounding loop of the second connected component. In this case, for the partition of the second connected component, the index information is given to the header by two methods as shown in FIGS. 24A and 24B. FIG. 24A illustrates header information of a partition in the case of bounding loop indexing for each connected component, and FIG. 24B illustrates header information of a partition in the case of bounding loop indexing for overall models.

<Generation of Triangle Graph Orientation and Arrangement of the Same in Bitstreams>

According to the conventional topological surgery, the traversing direction is fixed in coding a triangle graph. In other words, once the first traversing direction is determined to be left, traversing is performed to the left throughout the overall triangle graph. In the conventional topological surgery, the orientation information is not given. Thus, the bitstream position on the triangle graph is important. The triangle graph is composed of a triangle run and triangle data.

Therefore, firstly, the orientation information can be arranged for the triangle run, and, secondly, the orientation information can be arranged for the triangle data. The second method can reduce the standby time for rendering and the capacity of a memory used, compared to the first method.

Since the triangle run information is first decoded prior to the triangle marching information, it is possible to know the number of triangles contained in the first coded branches. When the orientation information and the triangle run are decoded, if the number of triangles within the branches to be coded first is $t_1$ and the Y-vertex can be determined as follows:

In the case of coding the right branch (i.e., when the orientation value is 1)

If the index of the vertex of the right boundary of a branching triangle in the bounding loop is q, the index of the Y-vertex is as follows:

Position of Y-vertex=$q-t-2$

In the case of coding the left branch (i.e., when the orientation value is 0)

If the index of the vertex of the left boundary of a branching triangle in the bounding loop is p the index of the Y-vertex is as follows:

Position of Y-vertex=$p+t+2$

<Method for Coding Geometry in Data Partitioning>

Until now, the present invention has been described based on the connectivity of a model in a data partition. However, arrangement and coding of the geometry of bitstreams are also important. In the present invention, for error resilience and progressive rendering, the following is processed.

The information necessary for a current data partition includes the information appearing in the previous partition and new information which does not appear in the previous partition. The geometry used for both the previous partition and the current partition appears at the boundary of two partitions.

FIGS. 25A through 25E illustrate coding of geometric information in coding partition information, in which shaded circles denote geometry coded only in the previous partition, black circles denote geometry coded in both the previous partition and the current partition, white circles denote geometry coded in the current partition, and thick, black solid lines denote boundaries between partitions.

Figure 25A:
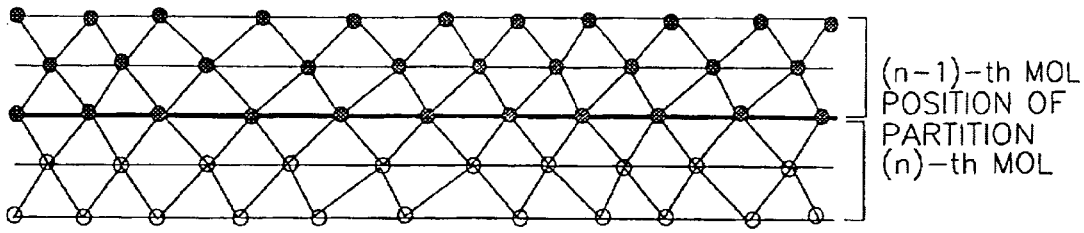
FIGS. 25A through 25E illustrate coding of geometry in coding partition information.
Figure 25B:
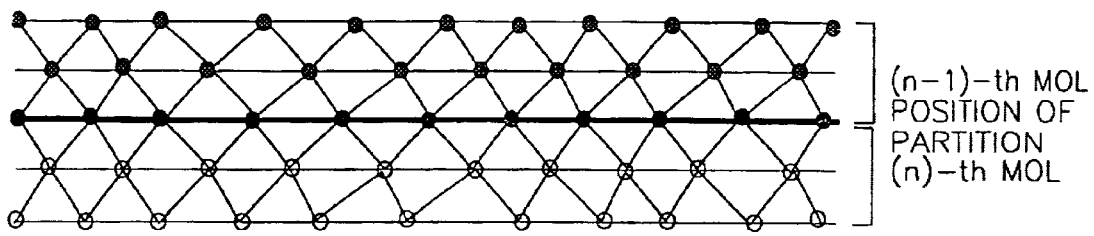
Figure 25C:
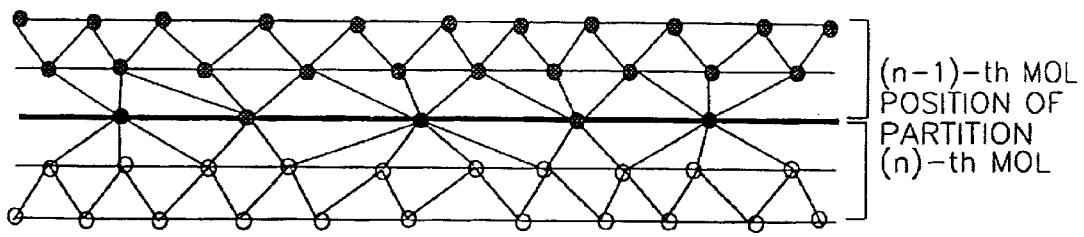
Figure 25D:
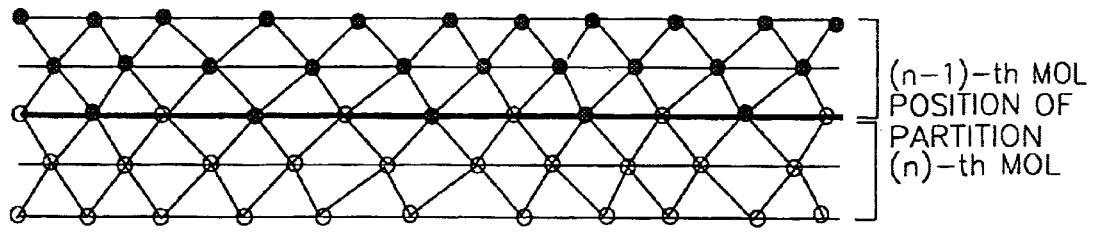
Figure 25E:
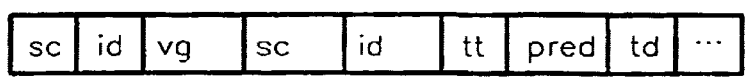

FIG. 25A shows the geometry appearing in a partition boundary, which is not overlapped, FIG. 25B shows the geometry appearing in a partition boundary, which is overlapped and coded in both the previous partition and the current partition, FIG. 25C shows that from the geometry in a partition boundary, only the points forming several edges within the current partition are simultaneously coded in the previous partition and the current partition, FIG. 25D shows that the overlapping geometry is sampled and distributively coded in two partitions, and FIG. 25E shows the syntax in a method in which the geometry shown in FIG. 25A or 25B is selectively used.

In other words, the geometry coding method in data partitioning is classified as follows.

Firstly, as shown in FIG. 25A, among the geometry information included in the current partition, only the information not coded in the previous partition is coded in the current partition.

Secondly, as shown in FIG. 25B, the information on the boundary coded in the previous partition is also coded in the current partition, thereby restoring the geometry in the current partition independently from the previous partition.

Thirdly, as shown in FIG. 25C, among data coded in the previous partitions, only the geometry connected with several geometries also appearing in the current partition is coded in the current partition.

Fourthly, as shown in FIG. 25D, since the geometry overlapping and appearing in both the previous partition and the current partition generally appears consecutively in a boundary of a triangle strip, one half of the overlapping data is coded in the previous partition and the other half is coded in the current partition.

However, the above-described methods have the following issues.

Although the first method can be easily implemented, the amount of surrounding data which can be used for estimation for coding the geometry is smaller than that in the second method, which lowers the accuracy of the geometry.

The second method is better than the first method, in view of the accuracy of the geometry. However, according to this method, since the geometry appearing in the boundary is overlapped and coded in two partitions, the compression ratio is worsened.

The third method can maintain the accuracy of the geometry while maintaining an appropriate level of compression. However, according to the third method, the characteristic of the connectivity must be known.

In the fourth method, the geometry is not overlapped and coded, compared to the second method, which improves the compression ratio. However, it is difficult to perform rendering by the fourth method, compared to the first method. In other words, the first, second and third methods enable restoration and rendering by themselves, and the fourth method enables rendering by generating values omitted in the current partition by interpolating the surrounding geometry, or requires a standby time for the next partition.

In consideration of the above issues, in an embodiment of the present invention, the first or second method is adaptively used. In such an adaptive method, the geometry of a data partition is basically coded by the first method but the second method can also be used according to the type of partition.

In other words, if the estimated value of a header is set to 0, the partition is coded by the first method; and if the estimated value of a header is set to 1, the partition is coded by the second method.

<Position of Geometry and Photometry>

Until now, a method for partitioning connectivity of a mesh has been described. The coding method of photometry information including geometry, color, normal and texture coordinates is important for error resilience and progressive rendering. In this case, the following coding methods can be considered. FIGS. 26A through 26C illustrate syntaxes for arranging data such as marching bit, geometry and property information in partitioning the same. Firstly, as shown in FIG. 26A, the photometry information is coded for each marching bit. According to this method, while decoding marching bits and polygonal edge information, triangles can be immediately restored and rendered. Therefore, this method is employed in an embodiment of the present invention. However, as shown in FIGS. 26B and 26C, respectively, marching bitstreams, geometry and photometry information may be separately combined.

Figure 27:
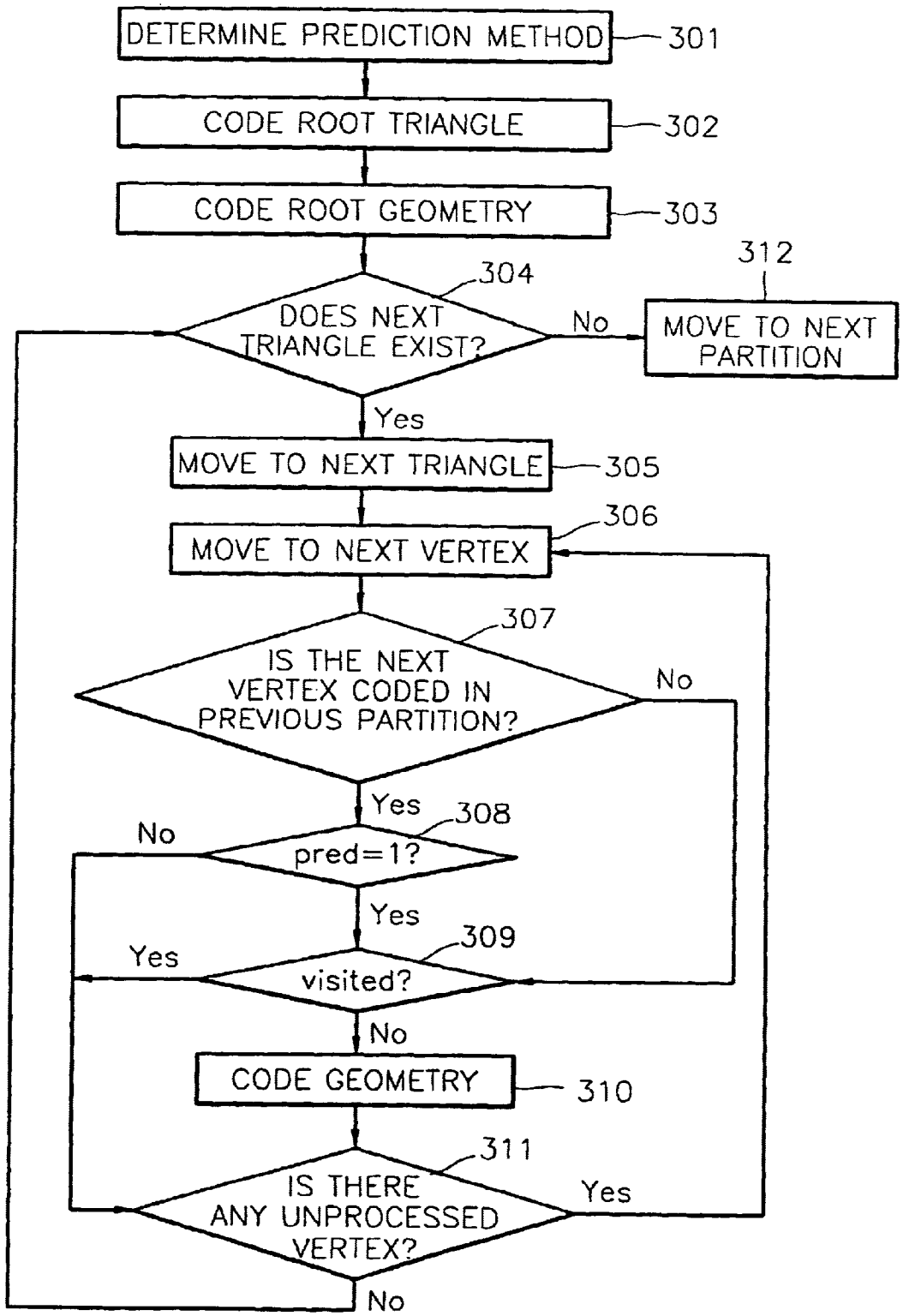
FIG. 27 is a conceptual diagram of a geometry coding method.

FIG. 27 is a flowchart for coding geometry by using the methods shown in FIGS. 25A and 25B and arranging the geometry by the method shown in FIG. 26A. In FIG. 27, the term 'pred' denotes a coding method for the geometry appearing between two partitions. If pred=0, only one partition is coded. If pred=1, the geometry on the boundary is coded in both partitions. The term 'visited' denotes coding or non-coding of each vertex in the partition. If 'visited'=0, coding has not yet been performed. If 'visited'=1, coding has already been performed.

In FIG. 27, a prediction method is determined (step 301). In other words, it is determined whether coding is to be performed by the method shown in FIG. 25A or 25B.

The first triangle, a root triangle partition, is coded (step 302).

Root geometry is coded (step 303).

It is checked whether there is a next triangle or not (step 304), the routine is moved to the next triangle if there is a next triangle (step 305). Otherwise, the routine is moved to the next partition (step 312).

It is determined whether each vertex of the triangle is coded in the previous partition (steps 306 and 307). If coding is not performed in the previous partition, it is determined whether coding is performed in the current partition (step 309). If not, the current partition is coded (step 31). If the vertex is coded in the previous partition but the estimated value is 1 (step 308), it is determined whether coding has been already performed (step 309). If not, coding is performed (step 310).

The steps 305 through 310 are repeated up to the last triangle of the current partition.

<Syntax of Data Partition>

FIG. 27 is also applied for other photometry information represented per vertex.

FIG. 28 is a diagram of a syntax in a partition according to the present invention, in which reference character 'sc' denotes a start code, 'id' denotes an identifier of a data partition, '#tri' denotes the number of triangles contained in a data partition. If an error is generated, the corresponding data partition must be transmitted again. Here, 'id' is used for requesting to transmit the data partition again to a transmission side. In other words, in order to receive a desired partition, it is enough for a reception side just to request to transmit again the data partition having the corresponding identifier 'id'. The reason for coding the number of triangles, i.e., '#tri' in FIG. 28, is because the size of a data partition is not fixed. In other words, data partitioning is performed by using triangle graph characteristics not by using the size of bitstreams. However, the sizes of partitions are not uniform. If the number of triangles produced during a decoding process is known, decoding of partitions can be completed. In other words, the number of triangles equals to the sum of marching bits, leaf bits and branching bits of the triangle graph and is equal to the number of polygonal edges (If the first polygonal edge is not coded, this must also be contained.

<Partitioning Method Based on Partition Size>

For data partitioning, the information of the end of a data partition is necessary. The end of a data partition can be known by inference through data analysis or by giving information of data size. In the latter case, the following methods are used.

1. Only the vertex graph is coded. Since the end of the vertex graph is known by interpretation, the end of a data partition can be known therefrom.

2. The triangle graph is used as a data partition. Since the triangle graph forms a binary tree, the end of the data partition can be easily known by inference.

3. If a connected component is used as a data partition, the end of a partition can be easily known through the methods 1 and 2. In other words, since the vertex graph is coded and then the triangle graph is coded, if the vertex graph is restored, it is naturally known that the following information is the triangle graph and the triangle graph is inferred by the above method 2, such that the end of a partition can be known.

4. The method for partitioning data with a fixed size includes a method of determining the size of bitstreams and a method of fixing the number of triangles contained in a data partition. In the former case, the end of the data is recognized after a predetermined number of bits have been processed. In the latter case, the end of the data is recognized when triangles corresponding to a predetermined number are restored.

5. In the case of partitioning data in a main branch to determine the Y-vertices, the sizes of partitions are not uniform. To solve this problem, the size of a partition is fixed. In the case when the partitioned position is not in the main branch while processing by the method 4, if the first triangle of the next main branch appears, data partitioning is performed immediately before or after the first triangle.

Now, the coding syntax for implementing progressive 3D mesh and error resilience will be described.

The compressed bitstream for a 3D polygonal mesh is composed of a header data block with global information, followed by a sequence of connected component data blocks, each one associated with one connected component of the mesh.

| 3D Mesh Header | CC Data #1 | ... | CC Data #n |
|---|---|---|---|

Additionally, if the mesh is represented in hierarchical mode, the last connected component data block is followed by one or more refinement step data blocks, each one of them representing a Forest Split operation.

| Forest Split #1 | Forest Split #2 | ... | Forest Split #m |
|---|---|---|---|

Each connected component data block is composed of three records, the vertex graph, the triangle tree record, and the triangle data record.

| Vertex Graph | Triangle Tree | Triangle Data |
|---|---|---|

The triangle tree record contains the structure of a triangle spanning tree which links all the triangles of the corresponding connected components forming a simple polygon. The mesh is represented in triangulated form in the bitstream, which also contains the information necessary to reconstruct the original faces. The vertex graph record contains the information necessary to stitch pairs of boundary edges of the simple polygon to reconstruct the original connected component connectivity. The connectivity is partitioned into global information (per connected component) and local information (per triangle). The global information is stored in the Vertex Graph and Triangle Tree records. The local information is stored in the Triangle Data record.

The triangle data is arranged on a per triangle basis, where the ordering of the triangles is determined by the traversal of the triangle tree.

| Data for triangle #1 | Data for triangle #2 | ... | Data for triangle #n |
|---|---|---|---|

The data for a given triangle is organized as follows:

| orientation bit | marching bit | polygon bit | coord | normal | color | texCoord |
|---|---|---|---|---|---|---|

The orientation bit denotes which branch will first be coded between two branches. The marching bit and polygon bit constitute the per triangle connectivity. The other fields contain information to reconstruct the vertex coordinates (coord) and optionally, normal, color, and texture coordinate (texCoord) information.

If the mesh is encoded in hierarchical mode, each Forest Split data block is composed of an optional pre-smoothing data block, a post-smoothing data block, and one or more connected component update data blocks.

| Pre-smoothing | Post-smoothing | Update CC #1 | ... | Update CC #h |
|---|---|---|---|---|

The pre-smoothing data block contains the parameters necessary to apply a smoothing step as a global predictor for vertex coordinates.

The post-smoothing data block contains the parameters necessary to apply a smoothing step to the vertex coordinates to remove quantization artifacts.

Each connected component update data block is composed of a pre update data block and a post update data block.

| Pre Update | Post Update |
|---|---|

The pre update data block is composed of a forest data block, which contains information to determine which edges of the current level of detail constitute a forest in the graph of the current level mesh, and a triangle data block with the per-triangle connectivity, and the photometry data updates for properties bound per-face and per-corner.

After the connectivity is updated from the information contained in the pre update data block, the pre-smoothing operation specified by the parameters stored in the pre-smoothing data block is applied as a global predictor for the vertex coordinates.

The post update data block contains vertex coordinate updates, with respect to the vertex coordinates predicted by the pre-smoothing step, for vertices which belong to a tree loop. Optionally, the post update data block also contains vertex coordinate updates and photometry updates for faces of the current connected component not incident to any tree of the forest.

Hereinafter, the syntax of coding utilizing a variable partitioning method will be described. Here, nTrianglesPer-MOC is the number of target triangles at a partition MOC.

```
3D Syntax
3D Mesh Object
3D_Mesh_Object
3D_Mesh_Object ( ) {
        3D_MO_start_code                sc+7            uimsbf
        3D_Mesh_Object_Header ( )
```

-continued

```
        do {
                3D_Mesh_Object_Layer ( )
        } while (nextbits_bytealigned
( )==3D_MOL_start_code)
}
        3D_Mesh_Object_Header
3D_Mesh_Object_Header ( ) {
                ccw                                      1              blsbf
                convex                                   1              blsbf
                solid                                    1              blsbf
                creaseAngle                              6              uimsbf
                coord_header ( )
                normal_header ( )
                color_header ( )
                texCoord_header ( )
        cgd_data                                         1              blsbf
        if (cgd_data==1)
           cgd_header ( )
}
        3D_Mesh_Object_Layer
3D_Mesh_Object_Layer ( ) {
                3D_MOL_start_code                        sc+            uimsbf
                                                         7
                mol_id                                   8              uimsbf
        if (cgd_data==1) {
                N_Vertices                               24             uimsbf
                N_Triangles                              24             uimsbf
                N_Edges                                  24             uimsVf
        }
            if (mol_id=='00000000')
                    3D_Mesh_Object_Base_Layer ( )
            else
                    3D_Mesh_Object_Forest_Split ( )
}
        3D_Mesh_Object_Base_Layer
3D_Mesh_Object_Base_Layer ( ) {
            do {
                    3D_MOBL_start_code                   sc+7           uimsbf
                    mobl_id                              8              uimsbf
                    start_qcoder ( )
                    pt                                   2              bac
                    if (pt=='00'){
                        do {
                            vertex_graph ( )
                            triangle_tree ( )
                            triangle_data ( )
                            last_component                              bac
                        } while (!last_component)
                    }
                    else
                            connected_component (pt)
                    stop_qcoder ( )
            } while (nextbits_bytealigned
( )==3D_MOBL_start_code)
}
        coord_header
coord_header ( ) {
                coord_binding                            2              uimsbf
                coord_bbox                               1              blsbf
                if (coord_bbox) {
                    coord_xmin                           32             ieeefp
                    coord_ymin                           32             ieeefp
                    coord_zmin                           32             ieeefp
                    coord_size                           32             ieeefp
                }
                coord_quant                              5              uimsbf
                coord_pred_type                          2              uimsbf
                if (coord_pred_type=='10'){
                    coord_nlambda                        2              uimsbf
                    for (i=1;i<coord_nlambda-1;i++)
                        coord_lambda                     coord_quant+3
                }
}
        normal_header
normal_header ( ) {
                normal__binding                          2              uimsbf
                if (normal_binding !='00'){
                    normal_bbox                          1              blsbf
                    normal_quant                         5              uimsbf
```

-continued

| | | |
|---|---|---|
| normal_pred_type | 2 | uimsbf |
| if (normal_pred_type=='10'){ | | |
|     normal_nlambda | 2 | uimsbf |
|     for (i=1;i<normal_nlambda-1;i++) | | |
|         normal_lambda | normal_quant+3 | |
|     } | | |
| } | | |
| } | | |
| color_header | | |
| color_header ( ) { | | |
|   color_binding | 2 | uimsbf |
|   if (color_binding!='00'){ | | |
|     color_bbox | 1 | blsbf |
|     if (color_bbox) { | | |
|       color_rmin | 32 | ieeefp |
|       color_gmin | 32 | ieeefp |
|       color_bmin | 32 | ieeefp |
|       color_size | 32 | ieeefp |
|     } | | |
|     color_quant | 5 | uimsbf |
|     color_pred_type | 2 | uimsbf |
|     if (color_pred_type=='10'){ | | |
|       color_nlambda | 2 | uimsbf |
|       for (i=1 ;i<color_nlambda-1;i++) | | |
|         color_lambda | color_quant+3 | |
|     } | | |
|   } | | |
| } | | |
|   texCoord_header | | |
| texCoord_header ( ) { | | |
|   texCoord_binding | 2 | uimsbf |
|   if (texCoord_binding!='00'){ | | |
|     texCoord_bbox | 1 | blsbf |
|     if (texCoord_bbox) { | | |
|       texCoord_umin | 32 | ieeefp |
|       texCoord_vmin | 32 | ieeefp |
|       texCoord_size | 32 | ieeefp |
|     } | | |
|     texCoord_quant | 5 | uimsbf |
|     texCoord_pred_type | 2 | uimsbf |
|     if (texCoord_pred_type=='10'){ | | |
|       texCoord_nlambda | 2 | uimsbf |
|       for (i=1 ;i<texCoord_nlambda-1;i++) | | |
|         texCoord_lambda | texCoord_quant+3 | |
|     } | | |
|   } | | |
| } | | |
|   cgd_header | | |
| cgd_header( ) { | | |
|   N_Proj_Surface_Spheres | 4 | uimsbf |
|   if (N_Proj_Surface_Spheres< >0) { | | |
|     x_coord_Center_Point | 32 | ieeefl |
|     y_coord_Center_Point | 32 | ieeefl |
|     z_coord_Center_Point | 32 | ieeefl |
|     Normalized_Screen_Distance_Factor | 8 | uimsbf |
|     for (I=1;i<=N_Proj_Surface_Spheres;i++){ | | |
|       Radius | 32 | ieeefl |
|       Min_Proj_Surface | 32 | ieeefl |
|       N_Proj_Points | 8 | uimsbf |
|       for (j=1;j<=N_Proj_Points;j++){ | | |
|         Sphere_Point_Coord | 11 | uimsbf |
|         Proj_Surface | 32 | ieeefl |
|       } | | |
|     } | | |
|   } | | |
| } | | |
|   connected_component | | |
| connected_component (pt) { | | |
|   if (pt!=3) { | | |
|     vertex_graph ( ) | | |
|   else{ | | |
|     left_bloop_idx | log_bloop_len | bac |
|     right_bloop_idx | log_bloop_len | bac |
|     Prediction | 1 | bac |
|   } | | |
|   if (pt!=1) { | | |
|     triangle_tree ( ) | | |
|     triangle_data ( ) | | |

-continued

```
        }
}
        vertex_graph
vertex_graph ( ) {
        vg_simple                                   0–16        bac
        depth=0
        skip_last=0
        openloops=0
        do {
                do {
                        if (!skip_last) {
                                vg_last             0–16        bac
                                if (openloops>0) {
                                        vg_forward_run    0–     bac
                                        if (!vg_forward_run){
openloop-
                                                if (openloops>0)
vg_loop_index
                                                        break
                                        }
                                }
                        }
                        vg_run_length               0–          uac
                        vg_leaf                     0–16        bac
                        if (vg_leaf&&!vg_simple) {
                                vg_loop             0–16        bac
                                if (vg_loop)
                                        openloops++
                        }
                } while (0)
                if (vg_leaf==(vg_last&!skip_last))
                        if (vg_last&!skip_last)
                                depth--
                        else
                                depth++
                skip_last=!vg_leaf
        } while (depth >=0)
}
        triangle_tree
triangle_tree ( ) {
        depth = 0
        ntriangles = 0
        do {
                tt_run_length                       0–16        bac
                ntriangles += tt_run_length ( )
                tt_leaf                             0–16        bac
                if (tt_leaf) {
                        depth--
                        if (depth < 0)
                                break
                }
                else
                        depth++
        } while (ntriangles < ntrianglesPerMoc || depth > 0)
}
        triangle_data
triangle_data ( ) {
        triangulated                                0–16        bac
        depth = 0;
        root_triangle ( )
        for (i=1; i<ntriangles) {
                if (tt_run) {
                        if (tt_leaf) depth--
                        else    depth++
                }
                triangle ( )
                I++;
                if (depth < 0 && i < ntriangles) {
                        triangulated                0–16        bac
                        root_triangle ( )
                        i++;
                        depth = 0;
                }
        }
}
        root_triangle
root_triangle ( ){
        if (marching_triangle)
                marching_pattern                    0-16        bac
```

-continued

```
            root_coord ( )
            root_normal ( )
            root_color ( )
            root_texCoord ( )
}
root_coord ( ) {
            root_coord_sample ( )
            coord_sample ( )
            coord_sample ( )
}
root_normal ( ) {
            if (normal_binding != '00') {
                    root_normal_sample ( )
                    if (normal_binding != '10'){
                            normal_sample ( )
                            normal_sample ( )
                    }
            }
}
root_color ( ) {
            if (color_binding != '00') {
                    root_color_sample ( )
                    if (color_binding != '10') {
                            color_sample ( )
                            color_sample ( )
                    }
            }
}
root_texCoord ( ) {
            if (texCoord_binding != '00') {
                    root_texCoord_sample ( )
                    texCoord_sample ( )
                    texCoord_sample ( )
            }
}
        triangle
triangle ( ) {
            if (marching_triangle)
                    marching_pattern                0–16         bac
            if (!triangulated)
                    polygon_edge                    0–16         bac
            coord ( )
            normal ( )
            color ( )
            texCoord ( )
}
coord ( ) {
            if (!visited)
                    coord_sample ( )
}
normal ( ) {
            if (normal_binding == '01') {
                    if (!visited)
                            normal_sample ( )
            }
            else if (normal_binding == '10') {
                    if (triangulated || polygon_edge)
                            normal_sample ( )
            }
            else if (normal_binding == '11') {
                    if (triangulated || polygon_edge) {
                            normal_sample ( )
                            normal_sample ( )
                    }
                    normal_sample ( )
            }
}
color ( ) {
            if (color_binding == '01') {
                    if (!visited)
                            color_sample ( )
            }
            else if (color_binding == '10') {
                    if (triangulated || polygon_edge)
                            color_sample ( )
            }
            else if (color_binding == '11') {
                    if (triangulated || polygon_edge) {
                            color_sample ( )
```

```
                color_sample ( )
            }
            color_sample ( )
        }
    }
}
texCoord ( ) {
        if (texCoord_binding == '01') {
            if (!visited)
                texCoord_sample ( )
        }
        else if (texCoord_binding == '11') {
            if (triangulated || polygon_edge) {
                texCoord_sample ( )
                texCoord_sample ( )
            }
            texCoord_sample ( )
        }
}
coord_root_sample ( ) {
        for (i=0; i<3; i++)
            for (j=0; j <coord_quant; j++)
                coord_bit                               0-1         bac
}
normal_root_sample ( ) {
        for (i=0; i<1; i++)
            for (j=0; j<normal_quant; j++)
                normal_bit                              0-1         bac
}
color_root_sample ( ) {
        for (i=0; i<3; i++)
            for (j=0; j<color_quant; j++)
                color_bit                               0-1         bac
}
texCoord_root_sample ( ) {
        for (i=0; i<2; i++)
            for (j=0; j<texCoord_quant; j++)
                texCoord_bit                            0-1         bac
}
coord_sample ( ) {
        for (i=0; i<3; i++) {
            j=0
            do {
                coord_leading_bit                       0-16        bac
                j++
            } while (j<coord_quant && !coord_leading_bit)
            if (coord_leading_bit) {
                coord_sign_bit                          0-1         bac
                do {
                    coord_trailing_bit
                } while (j<coord_quant)
            }
        }
}
normal_sample ( ) {
        for (i=0; i<1; i++) {
            j=0
            do {
                normal_leading_bit                      0-16        bac
                j++
            } while (j<normal_quant && !normal_leading_bit)
            if (normal_leading_bit) {
                normal_sign_bit                         0-1         bac
                do {
                    normal_trailing_bit
                } while (j<normal_quant)
            }
        }
}
color_sample ( ) {
        for (i=0; i<3; i++) {
            j=0
            do {
                color_leading_bit                       0-16        bac
                j++
            } while (j<color_quant && !color_leading_bit)
            if (color_ieading_bit) {
                color_sign_bit                          0-1         bac
                do {
                    color_trailing_bit
```

```
            } while (j<color_quant)
          }
       }
    }
    texCoord_sample ( ) {
       for (i=0; i<2; i++) {
          j=0
          do {
             texCoord_leading_bit          0–16            bac
             j++
          } while (j<texCoord_quant && !texCoord_leading_bit)
          if (texCoord_leading_bit) {
             texCoord_sign_bit             0–1             bac
             do {
                texCoord_trailing_bit
             } while (j<texCoord_quant)
          }
       }
    }
```

<3D Mesh Object>
3D_Mesh_Object
  MO_start_code: This is a unique code of 32 bits in length (sc+7) that is used for synchronization.
3D_Mesh_Object_Heder
  ccw: This boolean value indicates if the vertex ordering of the decoded faces follows a counter clockwise order.
  convex: This boolean value indicates if the model is convex.
  solid: This boolean value indicates if the model is a solid.
  creaseAngle: This 6-bit unsigned integer indicates the crease angle.
3D Mesh_Object_Layer
  MOL_start_code: This is a unique code of 32 bits in length (sc+7) that is used for synchronization.
  mol_id: This 8-bit unsigned integer specifies a unique id for the mesh object layer. A value of 0 indicates a base layer, and a value larger than 0 indicates a refinement layer. The first 3D_Mesh_Object_Layer immediately after a 3D_Mesh_Object_Header must have mol_id=0, and subsequent 3D_Mesh_Object_Layer's within the same 3D_Mesh_Object must have mol_id>0.
  N-Vertices is the number of vertices in the current resolution of the 3D mesh. Used to support computational graceful degradation.
  N-Triangles is the number of triangles in the current resolution of the 3D mesh. Used to support computational graceful degradation.
  N-Edges is the number of edges in the current resolution of the 3D mesh. Used to support computational graceful degradation.
3D_Mesh_Object_Base_Layer
  MOBL_start_code: This is a unique code of 32 bits in length (sc+7) that is used for synchronization.
  mobl_id: This 8-bit unsigned integer specifies a unique id for the mesh object component.
  last_component: This boolean value indicates if there are more connected components to be decoded. If last_component is true, then the last component has been decoded. Otherwise, there are more components to be decoded. This field is arithmetic coded.
coord_header
  coord_binding: This 2-bit unsigned integer indicates the binding of vertex coordinates to the 3D mesh. The only admissible value is '01'.
  coord_bbox: This boolean value indicates whether a bounding box is provided for the geometry. If no bounding box is provided, a default is used.
  coord_xmin, coord_ymin and coord_zmin: These floating point values indicate the lower left corner of the bounding box in which the geometry lies.
  coord_size: This floating point value indicates the size of the bounding box.
  coord_quant: This 5-bit unsigned integer indicates the quantization step used for geometry.
  coord_pred_type: This 2-bit unsigned integer indicates the type of prediction used to reconstruct the vertex coordinates of the mesh.

TABLE 2

Admissible values for coord_pred_type

| coord_pred_type | prediction type |
| --- | --- |
| 00 | no prediction |
| 01 | invalid |
| 10 | parallelogram prediction |
| 11 | polygon prediction | coord_nlambda: This 2-bit unsigned integer indicates the number of ancestors used to predict geometry. Admissible values of coord_nlambda are 1 and 3. Table 3 shows admissible values as a function of normal_pred_type.

TABLE 3

Admissible values for coord_nlambda as a function of coord_pred_type

| coord_pred_type | coord_nlambda |
| --- | --- |
| 00 | 1 |
| 01 | invalid |
| 10 | 3 |
| 11 | 1 | coord_lambda: This unsigned integer indicates the weight given to an ancestor for prediction. The number of bits used for this field is equal to coord_quant+3.
normal_header
  normal_binding: This 2-bit unsigned integer indicates the binding of normals to the 3D mesh. The admissible values are described in Table 4.

TABLE 4

Admissible values for normal_binding

| normal_binding | binding |
|---|---|
| 00 | no normals are coded |
| 01 | one normal is coded per vertex |
| 10 | one normal is coded per face |
| 11 | one normal is coded per corner | normal_bbox: This boolean value should always be false ('0').

normal_quant: This 5-bit unsigned integer indicates the quantization step used for normals.

normal_pred_type: This 2-bit unsigned integer indicates how normal values are predicted.

TABLE 5

Admissible values for normal_pred_type

| normal_pred_type | prediction type |
|---|---|
| 00 | no prediction |
| 01 | tree prediction |
| 10 | parallelogram prediction |
| 11 | invalid |

TABLE 6

Admissible combinations for normal_binding and normal_pred_type

| normal_binding | normal_pred_type |
|---|---|
| 00 | ignored |
| 01 | 10 |
| 10 | 01 |
| 11 | 01 | normal_nlambda: This 2-bit unsigned integer indicates the number of ancestor used to predict normals. Admissible values of normal_nlambda are 1 and 3. Table 7 shows possible values as a function of normal_pred_type.

TABLE 7

Admissible values for normal_nlambda as a function of normal_pred_type

| normal_pred_type | normal_nlambda |
|---|---|
| 00 | 1 |
| 01 | 1 |
| 10 | 3 |
| 11 | 1 | normal_lambda: This unsigned integer indicates the weight given to an ancestor for prediction. The number of bits used for this field is equal to normal_quant+3.

color_header color_binding: This 2-bit unsigned integer indicates the binding of colors to the 3D mesh. The admissible values are described in Table 8.

TABLE 8

Admissible values for color_binding

| color_binding | binding |
|---|---|
| 00 | no colors are coded |
| 01 | one color is coded per vertex |
| 10 | one color is coded per face |
| 11 | one color is coded per corner | color_bbox: This boolean value indicates if a bounding box for colors is given.

color_rmin, color_gmin and color_bmin: These 3 floating point values give the position of the lower left corner of the bounding box in RGB space.

color_size: This floating point value gives the size of the color bounding box.

color_quant: This 5-bit unsigned integer indicates the quantization step used for colors.

color_pred_type: This 2-bit unsigned integer indicates how colors are predicted.

TABLE 9

Admissible values for color_pred_type

| color_pred_type | prediction type |
|---|---|
| 00 | no prediction |
| 01 | tree prediction |
| 10 | parallelogram prediction |
| 11 | invalid |

TABLE 10

Admissible values for color_binding and color_pred_type

| color_binding | color_pred_type |
|---|---|
| 00 | ignored |
| 01 | 10 |
| 10 | 01 |
| 11 | 01 | color_nlambda: This 2-bit unsigned integer indicates the number of ancestors used to predict colors. Admissible values of color_nlambda are 1 and 3. Table 11 shows admissible values as a function of color_pred_type.

TABLE 11

Admissible values for color_nlambda as a function of color_prediction_type

| color_pred_type | color_nlambda |
|---|---|
| 00 | 1 |
| 01 | 1 |
| 10 | 3 |
| 11 | 1 | color_lambda: This unsigned integer indicates the weight given to an ancestor for prediction. The number of bits used for this field is equal to color_quant+3.

texCoord_header texCoord_binding: This 2-bit unsigned integer indicates the binding of textures to the 3D mesh. The admissible values are described in Table 12.

TABLE 12

Admissible values for texCoord_binding

| texCoord_binding | binding |
|---|---|
| 00 | no textures are coded |
| 01 | one texture is coded per vertex |
| 10 | one texture is coded per face |
| 11 | one texture is coded per corner | texCoord_bbox: This boolean value indicates if a bounding box for textures is given.

texCoord_umin and texCoord_vmin: These 2 floating point values give the position of the lower left corner of the bounding box in 2D space.

texCoord_size: This floating point value gives the size of the texture bounding box.

texCoord_quant: This 5-bit unsigned integer indicates the quantization step used for textures.

texCoord_pred_type: This 2-bit unsigned integer is always '10' if texCoord_binding is '10', and '01' otherwise.

texCoord_nlambda: This 2-bit unsigned integer indicates the number of ancestors used to predict textures. Admissible values of texCoord_nlambda are 1 and 3. Table 13 shows admissible values as a function of texCoord_pred_type.

TABLE 13

Admissible values for texCoord_nlambda as a function of texCoord_pred_type

| texCoord_pred_type | texCoord_nlambda |
|---|---|
| 00 | 1 |
| 01 | 1 |
| 10 | 3 |
| 11 | 1 | texCoord_lambda: This unsigned integer indicates the weight given to an ancestor for prediction. The number of bits used for this field is equal to texCoord_quant+3.

Cgd_header

N-Proj_Surface_Spheres is the number of Projected Surface Spheres. Typically, this number is equal to 1.

x_coord_Center_Point is the x-coordinate of the center point (typically the gravity point of the object) of the Projected Surface Sphere.

y_coord_Center_Point is the y-coordinate of the center point (typically the gravity point of the object) of the Projected Surface Sphere.

z_coord_Center_Point is the z-coordinate of the center point (typically the gravity point of the object) of the Projected Surface Sphere.

Normalized_Screen_Distance_Factor indicates where the virtual screen is placed, compared to the radius of the projected surface sphere. The distance between the center point of the projected surface sphere and the virtual screen is equal to Radius (Normalized_Screen_Distance_Factor+ 1). Note that Radius is specified for each Projected Surface Sphere, while Normalized_Screen_Distance_Factor is specified only once.

Radius is the radius of the Projected Surface Sphere.

Min_Proj_Surface is the minimal projected surface value on the corresponding Projected Surface Sphere. This value is often (but not necessarily) equal to one of the Proj_Surface values.

N_Proj_Points is the number of points on the Projected Surface Sphere in which the projected surface will be transmitted. For all other points, the projected surface is determined by linear interpolation. N_Proj_Points is typically small (e.g., 20) for the first Projected Surface Sphere and very small (e.g., 3) for additional Projected Surface Spheres.

Sphere_Point_Coord indicates the index of the point position in an octahedron.

Proj_Surface is the projected surface in the point specified by Sphere_Point_Coord.

connected_component

3D_VG_MOC_start_code: This is a unique code of 32 bits in length (sc+7) that is used specially for synchronization of vertex graph MOC.

vg_moc_id: This unsigned integer indicates the identifier of vertex graph MOC.

3D_SP_MOC_start_code: This is a unique code of 32 bits in length (sc+7) that is used specially for synchronization of simple polygon MOC.

sp_moc_id: This unsigned integer indicates the identifier of the simple polygon MOC.

ntriangleperMOC: This unsigned integer indicates the length of the triangles which belong in a partition.

left_bloop_idx: This unsigned integer indicates the left starting index, within the bounding loop table, for the triangle strip which is reconstructed in a partition.

right_bloop_idx: This unsigned integer indicates the right starting index, within the bounding loop table, for the triangle strip which is reconstructed in a partition.

log_bloop_len is the log scaled value of the size of the bounding loop table.

prediction: This boolean value denotes how to encode/decode coordinate, color, normal and texture coordinate information which is common in two partitions, if the prediction value is one, all common information is coded in two partitions, otherwise, the common information is coded in just one partition.

vertex_graph vg_simple: This boolean value indicates if the current vertex graph is simple. A simple vertex graph does not contain any loops. This field is arithmetically coded.

vg_last: This boolean value indicates if the current run is the last run starting from the current branching vertex. This field is not coded for the first run of each branching vertex, i.e., when the skip_last variable is true. When not coded the value of vg_last for the current vertex run is considered to be false. This field is arithmetically coded.

vg_forward_run: This boolean value indicates if the current run is a new run. If it is not a new run, it must be a run previously traversed, indicating a loop in the graph. This field is arithmetic coded.

vg_loop_index: This unsigned integer indicates the index of the current run to which the current loop connects to. Its unary representation is arithmetically coded. If the variable openloops is equal to vg_loop_index, the trailing '1' in the unary representation is omitted.

TABLE 14

Unary representation of the vg_loop_index field

| vg_loop_index | unary representation |
|---|---|
| 0 | 1 |
| 1 | 01 |
| 2 | 001 |
| 3 | 0001 |
| 4 | 00001 |
| 5 | 000001 |

TABLE 14-continued

Unary representation of the vg_loop_index field

| vg_loop_index | unary representation |
|---|---|
| 6 | 0000001 |
| ... | |
| openloops-1 | openloops-1 0's | vg_run_length: This unsigned integer indicates the length of the current vertex run. Its unary representation is arithmetically coded.

TABLE 15

Unary representation of the vg_run_length field

| vg_run_length | unary representation |
|---|---|
| 1 | 1 |
| 2 | 01 |
| 3 | 001 |
| 4 | 0001 |
| 5 | 00001 |
| 6 | 000001 |
| 7 | 0000001 |
| 8 | 00000001 |
| n | n-1 0's followed by 1 | vg_leaf: This boolean flag indicates if the last vertex of the current run is a leaf vertex. If it is not a leaf vertex, it is a branching vertex. This field is arithmetically coded.

vg_loop: This boolean flag indicates if the leaf of the current run connects to a branching vertex of the graph, indicating a loop. This field is arithmetically coded.

triangle_tree tt_run_length: This unsigned integer indicates the length of the current triangle run. Its unary representation is arithmetically coded.

TABLE 16

Unary representation of the tt_run_length field

| tt_run_length | unary representation |
|---|---|
| 1 | 1 |
| 2 | 01 |
| 3 | 001 |
| 4 | 0001 |
| 5 | 00001 |
| 6 | 000001 |
| 7 | 0000001 |
| 8 | 00000001 |
| n | n-1 0's followed by 1 | tt_leaf: This boolean flag indicates if the last triangle of the current run is a leaf triangle. If it is not a leaf triangle, it is a branching triangle. This field is arithmetically coded.

triangulated: This boolean value indicates if the current component contains triangles only. This field is arithmetically coded.

marching_triangle: This boolean value is determined by the position of the triangle in the triangle tree. The value marching_triangle=0 if the triangle is a leaf or branching triangle, and marching_triangle=1 otherwise.

marching_pattern: This boolean flag indicates the marching pattern of edges inside a triangle run. A "0" stands for a march to the left, and a 1 for a march to the right. This field is arithmetically coded.

polygon_edge: This boolean flag indicates whether the base of the current triangle is an edge that should be kept when reconstructing the 3D mesh object. If the base of the current triangle is not to be kept, it is discarded. This field is arithmetically coded.

triangle coord_bit: This boolean value indicates the value of a geometry bit. This field is arithmetically coded.

coord_heading bit: This boolean value indicates the value of a heading geometry bit. This field is arithmetically coded.

coord_sign_bit: This boolean value indicates the sign of a geometry sample. This field is arithmetically coded.

coord_trailing bit: This boolean value indicates the value of a trailing geometry bit. This field is arithmetically coded.

normal_bit: This boolean value indicates the value of a normal bit. This field is arithmetically coded.

normal_heading_bit: This boolean value indicates the value of a heading normal bit. This field is arithmetically coded.

normal_sign_bit: This boolean value indicates the sign of a normal sample. This field is arithmetically coded.

normal_trailing_bit: This boolean value indicates the value of a normal trailing bit. This field is arithmetically coded.

color_bit: This boolean value indicates the value of a color bit. This field is arithmetically coded.

color_heading_bit: This boolean value indicates the value of a heading color bit. This field is arithmetically coded.

color_sign_bit: This boolean value indicates the sign of a color sample. This field is arithmetically coded.

color_trailing_bit: This boolean value indicates the value of a trailing color bit. This field is arithmetically coded.

texCoord_bit: This boolean value indicates the value of a texture bit. This field is arithmetically coded.

texCoord_heading_bit: This boolean value indicates the value of a heading texture bit. This field is arithmetically coded.

texCoord_sign_bit: This boolean value indicates the sign of a texture sample. This field is arithmetically coded.

texCoord_trailing_bit: This boolean value indicates the value of a trailing texture bit. This field is arithmetically coded.

3D_Mesh_Object_Forest_Split

MOFS_start_code: This is a unique code of 32 bits in length (sc+7) that is used for synchronization.

mofs_id: This 8-bit unsigned integer specifies a unique id for the forest split component.

pre_smoothing: This boolean value indicates whether the current forest split operation uses a pre-smoothing step to globally predict vertex positions.

pre_smoothing_n: This integer value indicates the number of iterations of the pre-smoothing filter.

pre_smoothing_lambda: This floating point value is the first parameter of the pre-smoothing filter.

pre_smoothing_mu: This floating point value is the second parameter of the pre-smoothing filter.

post_smoothing: This boolean value indicates whether the current forest split operation uses a post-smoothing step to globally predict vertex positions.

post_smoothing_n: This integer value indicates the number of iterations of the post-smoothing filter.

post_smoothing_lambda: This floating point value is the first parameter of the post-smoothing filter.

post_smoothing_mu: This floating point value is the second parameter of the post-smoothing filter.

sharp_edges: This boolean value indicates if data is included in the bitstream to mark smoothing discontinuity edges or not. If sharp_edges==0 no edge is marked as a smoothing discontinuity edge. If smoothing discontinuity edges are marked, then both the pre-smoothing and post-smoothing filters take them into account.

fixed_vertices: This boolean value indicates if data is included in the bitstream to mark vertices which do not move during the smoothing process. If sharp_edges==0 all vertices are allowed to move. If fixed vertices are marked, then both the pre-smoothing and post-smoothing filters take them into account.

edge_mark: This boolean value indicates if a corresponding edge is marked as a smoothing discontinuity edge.

vertex_mark: This boolean value indicates if a corresponding vertex is marked as a fixed vertex or not.

tree_edge: This boolean value indicates if an edge should be added to the forest built so far.

other_update: This boolean value indicates whether updates for vertex coordinates and properties associated with faces not incident to any tree of the forest follow in the bitstream or not.

According to the present invention, firstly, even if a transmission error is generated, only the portion having the error is transmitted again, thereby reducing the network load and transmission time. Secondly, only a selected part of data can be restored and triangles or polygons for the restored part are processed, thereby displaying the data on a display device.

What is claimed is:

1. A progressive coding method of three dimensional (3D) mesh information comprising the steps of:
   (a) dividing a 3D triangle mesh of a model into one or more connected components;
   (b) generating a vertex graph and a triangle graph for each of the connected components;
   (c) partitioning the vertex graph and triangle graph constituting the connected components into data partitions each capable of being independently decoded for the respective connected components and then coding the same;
   (d) coding geometry containing positions of vertices of triangles constituting each partition, and photometry containing color, normal and texture coordinate information, for the respective data partitions.

2. The progressive coding method according to claim 1, wherein in the step (c), the vertex graph and triangle graph constituting the connected components are partitioned into independent data partitions for the respective connected components and then coded.

3. The progressive coding method according to claim 1, wherein in the step (c), all of the vertex graphs belonging to the model are collected and partitioned into data partitions having a predetermined size to then be coded, and all of the triangle graphs belonging to the model are collected and partitioned into data partitions having a predetermined size to then be coded.

4. The progressive coding method according to claim 1, wherein in the step (c), the vertex graphs constituting each connected component are coded into a data partition, and the triangle graphs are partitioned into data partitions having a predetermined size to then be coded.

5. The progressive coding method according to claim 1, wherein in the step (c), the vertex graphs and triangle graphs constituting the respective connected components are partitioned using one of prescribed partition types and coded, and then the partition type used for partitioning is coded.

6. The progressive coding method according to claim 5, wherein the partition types include a first partition type in which one or more vertex graphs and triangle graphs are sequentially contained, a second partition type in which only one vertex graph is contained, a third partition type in which the vertex graphs relating to the triangle graphs contained in other partition type and a part of the triangle graphs corresponding to the vertex graphs are contained, and a fourth partition type in which only triangle graphs are contained.

7. The progressive coding method according to claim 1, wherein in the step (c), of two branches connected to a branching triangle, the branch having fewer triangles is first coded and orientation information indicative of a traversing direction is then coded.

8. The progressive coding method according to claim 7, wherein the orientation information is given for each data partition containing the triangle graph.

9. The progressive coding method according to claim 7, wherein the orientation information is arranged in triangle trees constituting the triangle graphs.

10. The progressive coding method according to claim 7, wherein the orientation information is arranged in triangle data constituting the triangle graphs.

11. The progressive coding method according to claim 1, wherein if a branching triangle exists when the triangle graphs are partitioned and coded into data partitions in the step (c), data partitioning is performed at a position where all the triangle information of at least one of two branches connected to the branching triangle is contained.

12. The progressive coding method according to claim 1, wherein if a branching triangle exists when the triangle graphs are partitioned and coded into data partitions in the step (c), coding is performed with the Y-vertices of the branching triangle being contained in a header of the triangle graph.

13. The progressive coding method according to claim 12, wherein the Y-vertices are bounding loop indices therefor.

14. The progressive coding method according to claim 1, wherein when the 3D triangle mesh is reconstructed from a polygonal mesh into triangles so that it contains polygonal edges, in the step (c), partitioning is performed only at actual edges of the polygonal mesh, and the polygonal edges of the first triangle contained in the data partition of the triangle graph are not coded.

15. The progressive coding method according to claim 1, wherein when the 3D triangle mesh is reconstructed from a polygonal mesh into triangles so that it contains polygonal edges, in the step (c), partitioning is performed at both actual edges and virtual edges of the polygonal mesh, and the polygonal edges of the first triangle contained in the first data partition of the triangle graph are not coded.

16. The progressive coding method according to claim 1, wherein when the triangle graphs are partitioned and coded into data partitions in the step (c), coding is performed with pairs of bounding loop indices for starting points of the left and right boundaries in a triangle strip being contained in the header of the triangle graph.

17. The progressive coding method according to claim 16, wherein the indices for use in the pairs of bounding loop indices are one of a series of independent numbers for the respective connected components belonging to the model.

18. The progressive coding method according to claim 16, wherein the indices for use in the pairs of bounding loop indices are one of a series of numbers throughout the model.

19. The progressive coding method according to claim 1, wherein in the step (d), the geometry in the boundary between data partitions is coded only in the precedent data partition.

20. The progressive coding method according to claim 1, wherein in the step (d), the geometry in the boundary between data partitions is coded both in the precedent data partition and the subsequent data partition.

21. The progressive coding method according to claim 1, wherein in the step (d), the geometry in the boundary between data partitions is coded at the precedent data partition, and the geometry of the subsequent data partition and connected to more than a predetermined number is coded in the subsequent data partition.

22. The progressive coding method according to claim 1, wherein in the step (d), one half of the geometry sampled from the geometry in the boundary between data partitions is coded in the precedent data partition, and the other half is coded in the subsequent data partition.

23. The progressive coding method according to claim 1, wherein in the step (d), coding is selectively performed by a first geometry coding method in which the geometry in the boundary between data partitions is coded only at the precedent data partition, or a second geometry coding method in which the geometry in the boundary between data partitions is coded both in the precedent data partition and the subsequent data partition, and the selection information is then coded.

24. The progressive coding method according to claim 1, wherein in the step (d), the geometry and photometry are coded for the respective marching bits belonging to a data partition.

25. The progressive coding method according to claim 1, wherein in the step (d), the triangle graph, geometry and photometry belonging to a data partition are separately collected to form a partition and then coded.

26. The progressive coding method according to claim 1, wherein in the step (d), the triangle graph, geometry and photometry belonging to a data partition are separately collected to form each separate partition and then coded.

27. The progressive coding method according to claim 1, wherein the data partitions each contain an identifier and information on a number of triangles contained therein.

28. The progressive coding method according to claim 27, wherein the identifier corresponds to pairs of bounding loop indices for starting points on the left and right boundaries in a triangle strip when the triangle graphs are partitioned and coded into data partitions.

29. A progressive decoding method for receiving bitstreams coded by a progressive coding method comprising the steps of:

(a) dividing input bitstreams into units of data partitions;

(b) identifying the partition type of each of the data partitions;

(c) if the data partitions contain vertex graphs, decoding the vertex graphs to generate bounding loops;

(d) if the data partitions contain triangle graphs, decoding the triangle graphs to generate a 3D mesh; and (e) repeating the steps (a) through (d) to progressively generate 3D meshes.

30. The progressive decoding method according to claim 29, wherein the partition types include a first partition type in which one or more vertex graphs and triangle graphs are sequentially contained, a second partition type in which only one vertex graph is contained, a third partition type in which the vertex graphs relating to the triangle graphs contained in other partition type and a part of the triangle graphs corresponding to the vertex graphs are contained, and a fourth partition type in which only triangle graphs are contained.

31. The progressive decoding method according to claim 29, wherein orientation information is given to triangle trees constituting the triangle graphs and a decoding direction is determined by the orientation information.

32. The progressive decoding method according to claim 29, wherein orientation information is given to triangle data constituting the triangle graphs and a decoding direction is determined by the orientation information.

33. The progressive decoding method according to claim 29, wherein Y-vertices of a branching triangle are given to the header of the triangle graphs and decoding is performed by the Y-vertices in the case of decoding the branching triangle.

* * * * *